(12) United States Patent
Gao et al.

(10) Patent No.: US 9,705,655 B2
(45) Date of Patent: Jul. 11, 2017

(54) ACK/NACK FEEDBACK BIT NUMBER DETERMINATION METHOD AND DEVICE

(71) Applicant: China Academy of Telecommunications Technology, Beijing (CN)

(72) Inventors: Xuejuan Gao, Beijing (CN); Yanan Lin, Beijing (CN); Zukang Shen, Beijing (CN); Qianqian Si, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 71 days.

(21) Appl. No.: 14/409,363

(22) PCT Filed: Jun. 9, 2013

(86) PCT No.: PCT/CN2013/077050
§ 371 (c)(1),
(2) Date: Dec. 18, 2014

(87) PCT Pub. No.: WO2013/189252
PCT Pub. Date: Dec. 27, 2013

(65) Prior Publication Data
US 2015/0188687 A1    Jul. 2, 2015

(30) Foreign Application Priority Data
Jun. 19, 2012    (CN) .......................... 2012 1 0210284

(51) Int. Cl.
*H04B 7/00*    (2006.01)
*H04L 5/00*    (2006.01)
(Continued)

(52) U.S. Cl.
CPC .............. *H04L 5/0055* (2013.01); *H04L 1/16* (2013.01); *H04L 1/1607* (2013.01); *H04L 5/001* (2013.01);
(Continued)

(58) Field of Classification Search
CPC .. H04W 76/025; H04W 76/04; H04W 76/048
(Continued)

(56) References Cited

U.S. PATENT DOCUMENTS 8,565,167 B2 * 10/2013 Chen ................. H04W 72/0413
370/328
9,258,805 B2 * 2/2016 He ......................... H04L 5/1469
(Continued)

FOREIGN PATENT DOCUMENTS

| CN | 102025466 | 4/2011 |
| CN | 102136894 | 7/2011 |

(Continued)

OTHER PUBLICATIONS

3GPP, Physical layer procedures, TS 136. 213, V11.1.0, Dec. 2012, pp. 1-160.*
(Continued)

*Primary Examiner* — Dmitry H Levitan
(74) *Attorney, Agent, or Firm* — Foley & Lardner LLP; James F. Ewing; Paul M. H. Pua

(57) ABSTRACT

A method and device for determining an ACK/NACK feedback bit number, used when carriers having different time division duplex (TDD) uplink/downlink configurations are aggregated for a user equipment or the aggregated carriers includes at least one FDD carrier and at least one TDD carrier, and when the user equipment conducts ACK/NACK feedback on a physical uplink sharing channel (PUSCH) having a corresponding physical downlink control channel (PDCCH), the PDCCH containing a downlink
(Continued)

assignment index (DAI) domain. The method comprises: determining whether the carriers grouped by the user equipment contain a first type carrier; if yes, then determining (I) of each carrier c according to a parameter indicating the number of ACK/NACK feedback subframes; if no, then acquiring (II) and the Mc of each carrier c, and selecting the minimum value from (II) and the Mc as the (I) of each carrier c; according to the number of the downlink subframes in each carrier c in need of conducting ACK/NACK feedback on the current uplink subframe, determining the ACK/NACK feedback bit number that the current uplink subframe needs to feed back. The present invention ensures normal operation of a system based on the application scenario.

17 Claims, 3 Drawing Sheets

(51) Int. Cl.
  *H04L 1/16*    (2006.01)
  *H04L 5/14*    (2006.01)
(52) U.S. Cl.
  CPC .............. *H04L 5/0046* (2013.01); *H04L 5/14* (2013.01); *H04L 5/1469* (2013.01)
(58) Field of Classification Search
  USPC .......................... 370/310, 328, 329, 347, 348
  See application file for complete search history.

(56) References Cited

U.S. PATENT DOCUMENTS

| | | | | |
|---|---|---|---|---|
| 9,306,721 | B2* | 4/2016 | Jung ..................... | H04L 5/0055 |
| 2013/0114575 | A1* | 5/2013 | Fu .......................... | H04L 5/0053 |
| | | | | 370/336 |
| 2013/0329688 | A1* | 12/2013 | Yang ..................... | H04L 1/1861 |
| | | | | 370/329 |
| 2013/0336160 | A1* | 12/2013 | Yin ....................... | H04L 1/1854 |
| | | | | 370/254 |
| 2015/0358122 | A1* | 12/2015 | Yang ..................... | H04L 1/1822 |
| | | | | 370/280 |

FOREIGN PATENT DOCUMENTS

| | | |
|---|---|---|
| WO | WO-2012-024220 | 2/2012 |
| WO | WO-2012/064935 | 5/2012 |
| WO | WO-2013/187072 | 12/2013 |

OTHER PUBLICATIONS

ETSI TS 136 213 V.8.8.0, Physical Layer procedures, ETSI,Oct. 2009, pp. 1-79.*
LG Electronics. ACK/NACK transmission for TDD CA with different UL-DL configurations, 3GPP TSG RAN WG1 #70, R1-123508, China, Qingdao, Aug. 17, 2012.
International Search Report for PCT/CN2013/077050 mailed Aug. 29, 2013.
Office Action for Japanese Patent Application No. 2015-517593 mailed Jan. 12, 2016 (including English summary).
"3rd Generation Partnership Project; Technical Specification Group Radio Access Network; Evolved Universal Terrestrial Radio Access (E-UTRA) ; Physical layer procedures (Release 10)", 3GPP TS 36.213 VI0.5.0, (Mar. 2012).
Extended European Search Report for European Application No. 13806080.1 mailed Jun. 19, 2015.
"3rd Generation Partnership Project; Technical Specification Group Radio Access Network; Evolved Universal Terrestrial Radio Access (E-UTRA); Physical layer procedures (Release 10)", 3GPP Standard; 3GPP TS 36.213, $3^{rd}$ Generation Partnership Project (3GPP), Mobile Competence Centre ; 650, Route Des Lucioles; F-06921 Sophia-Antipolis Cedex; France, vol. RAN WGI, No. V10.5.0, Mar. 7, 2012 (Mar. 7, 2012), pp. 1-125, XP050579996, [retrieved on Mar. 7, 2012].
Catt et al: "Way forward on HARQ-ACK 1-15 transmission for TDD inter-band CA", 3GPP Draft; RI-122966, 3rd Generation Partnership Project (3GPP), Mobile Competence Centre ; 650, Route Des Lucioles; F-06921 Sophia-Antipolis Cedex; France, vol. RAN WGI, no. Prague, Czech Republic; May 21, 2012-May 25, 2012, May 25, 2012 (May 25, 2012), XP050601200, [retrieved on May 25, 2012].
ETSI TS 136 213 Technical Specification; LTE; Evolved Universal Terrestrial Radio Access (E-UTRA); Physical layer procedures, Release 11, 145 pages (Oct. 2012).
3GPP TSG RAN WG1 Meeting #66bis "Final Report of 3GPP TSG RAN WG1 #66 v1.0.0" R1-112886 Zhuhai, China, Oct. 10-14, 2011.
3GPP TSG RAN WG1 Meeting #67 "Final Report of 3GPP TSG RAN WG1 #66bis v1.1.0" R1-114352 San Francisco, USA, Nov. 14-18, 2011.
3GPP TSG RAN WG1 Meeting #68bis "Final Report of 3GPP 3GPP TSG RAN WG1 #68 v1.0.0" R1-120951 Jeju, South Korea, Mar. 26-30, 2012.
3GPP TSG RAN WG1 Meeting #69 "Final Report of 3GPP 3GPP TSG RAN WG1 #68bis v1.1.0" R1-122892 Prague, Czech Republic, May 21-25, 2012.
3GPP TSG RAN meeting #54 "Update to LTE Carrier Aggregation Enhancements WID" RP-111749 Berlin, Germany, Dec. 6-9, 2011.
3GPP TSG RAN meeting #55 "Report of 3GPP TSG RAN meeting #54" RP-120341 Xiamen, China, Feb. 28-Mar. 2, 2012.

* cited by examiner

ACK/NACK FEEDBACK BIT NUMBER DETERMINATION METHOD AND DEVICE

This application is a US National Stage of International Application No. PCT/CN2013/077050, filed on Jun. 9, 2013, designating the United States and claiming the priority to Chinese Patent Application No. 201210210284.8, filed with the Chinese Patent Office on Jun. 19, 2012 and entitled "Method of and apparatus for determining the number of ACK/NACK feedback bits", the content of which is hereby incorporated by reference in its entirety.

FIELD

The present invention relates to the field of wireless communications and particularly to a method of and apparatus for determining the number of ACK/NACK feedback bits.

BACKGROUND

In a Long Term Evolution (LTE) system, a radio frame is divided into ten sub-frames, the length of each sub-frame is 1 millisecond (ms). Seven TDD uplink/downlink configurations are defined for a radio frame of a Time Division Duplex (TDD) system. As depicted in Table 1, D represents a downlink sub-frame, U represents an uplink sub-frame, and S represents a special sub-frame of the TDD system. The special sub-frame is composed of three components including a Downlink Pilot Time Slot (DwPTS), a Guard Period (GP) and an Uplink Pilot Time Slot (UpPTS).

TABLE 1

| Uplink/ downlink configura- tion | Switching periodicity of downlink to uplink | Sub-frame index | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Compared with the LTE system, Long Term Evolution-Advanced (LTE-A) system has significantly improved system peak data rates, which requires up to 1 Gbps in the downlink and 500 Mbps in the uplink. Thus a bandwidth available to a User Equipment (UE) (also referred to as a terminal) needs to be extended in the LTE-A system, that is, a plurality of consecutive or inconsecutive carriers served by the same evolved Node B (eNB) are aggregated together to serve the UE concurrently. These carriers aggregated together are referred to as Component Carriers (CCs). Each cell can be a component carrier, and the bandwidth of each component carrier is no larger than 20 MHz to ensure backward compatibility with the LTE system.

Intra-band carrier aggregation (CA) and inter-band carrier aggregation can be applicable dependent upon the bands where the aggregated carriers are located. In the Release-11 (Rel-11) and releases subsequent thereto, a UE in a system with carrier aggregation can share or access an adjacent band with another system. As illustrated in FIG. 1, three carriers are aggregated for the UE, where the carrier 1 and the carrier 2 are located in the band 1 and the carrier 3 is located in the band 2. In order to avoid uplink/downlink cross interference between the adjacent TDD systems, the UE shall use an uplink/downlink configuration on the carrier 1 and the carrier 2 which can coexist with the adjacent 3G/LTE TDD system in the band A, and the UE shall use an uplink/downlink configuration on the carrier 3 which can coexist with the adjacent 3G/LTE TDD system in the band B. The so-called "coexist" refers to a configuration without uplink/downlink cross interference; for the LTE system, it refers to the same TDD uplink/downlink configuration. When the LTE system operates in the band A and the band B respectively with different TDD uplink/downlink configurations, the TDD uplink/downlink configuration of the carriers 1 and 2 is different from that of the carrier 3, that is, the carriers which have different TDD uplink/downlink configurations are aggregated for the UE.

The LTE-A UE needs to feed back Acknowledgment/Non-Acknowledgment (ACK/NACK) feedback information of a plurality of carriers (such as carriers of a TDD system and downlink carriers of a Frequency Division Duplex (FDD) system) and downlink sub-frames (where a special sub-frame is also considered as a downlink sub-frame because downlink data is transmitted in the DwPTS in the special sub-frame) in the same uplink sub-frame. The number of downlink sub-frames on a carrier for which ACK/NACK is fed back in the same sub-frame is defined as M, where the value of M differs from one uplink sub-frame to another and one TDD uplink/downlink configuration to another. Thus the value of M can be determined by the number of sub-frames in a set of downlink sub-frames associated with an uplink sub-frame in a corresponding TDD uplink/downlink configuration. The set of downlink sub-frames is composed of downlink sub-frames n-k associated with an uplink sub-frame n, where k∈ a set of indexes K. For the different TDD uplink/downlink configurations, the values in the set of index K are as depicted in Table 2. In Table 2, for the respective TDD uplink/downlink configurations, each uplink sub-frame n corresponds respectively to a set of indexes $K=\{k_0, k_1, \ldots k_{M-1}\}$. Particularly for special sub-frames with a downlink normal Cyclic Prefix (CP) and corresponding to special sub-frame configurations 0 and 5 and special sub-frames with a downlink extended CP and corresponding to special sub-frame configurations 0 and 4, no ACK/NACK is fed back for these special sub-frames. In other words, when the set of downlink sub-frames corresponding to the uplink sub-frame n includes the special sub-frames with a downlink normal CP and corresponding to special sub-frame configurations 0 and 5 and/or the special sub-frames with a downlink extended CP and corresponding to special sub-frame configurations 0 and 4, M represents the number of downlink sub-frames other than the special sub-frames in the set of downlink sub-frames corresponding to the uplink sub-frame n; otherwise, M represents the number of all the downlink sub-frames in the set of downlink sub-frames associated with the uplink sub-frame n.

TABLE 2

| Uplink/ downlink configura- tion | Sub-frame number | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |

TABLE 2-continued

| Uplink/downlink configuration | Sub-frame number | | | | | | | | | |
|---|---|---|---|---|---|---|---|---|---|---|
| | 0 | 1 | 2 | 3 | 4 | 5 | 6 | 7 | 8 | 9 |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

Table 2 only depicts the relationship between the uplink sub-frame and the set of indexes K in a radio frame as an example, where n−k<0 represents a sub-frame in a preceding radio frame.

In the Rel-11, transmission of a Physical Uplink Control Channel (PUCCH) is only supported on a Primary Component Carrier (PCC). A downlink Hybrid Automatic Repeat reQuest (HARQ) timing relationship (simply DL HARQ timing) of the PCC is determined by a TDD uplink/downlink configuration notified to the PCC in a System Information Block (SIB) 1. The so-called DL HARQ timing refers to a relationship between a sub-frame (a downlink sub-frame or a special sub-frame) on a carrier and an uplink sub-frame in which ACK/NACK feedback information of the sub-frame is transmitted. When TDD uplink/downlink configurations, notified in the SIB1's corresponding to the respective carriers aggregated for the UE, are different, in order to feed back the ACK/NACK of a Secondary Component Carrier (SCC), that is, in order to locate an uplink sub-frame on the PCC in which ACK/NACK of a downlink sub-frame on the SCC is transmitted, DL HARQ timing of the SCC needs to be determined from a reference TDD uplink/downlink configuration, where the reference TDD uplink/downlink configuration may be a TDD uplink/downlink configuration notified to the SCC or the PCC in the SIB1 or an existing TDD uplink/downlink configuration other than the TDD uplink/downlink configuration above.

In the scenario above, when ACK/NACK is transmitted on a Physical Uplink Shared Channel (PUSCH), for a PUSCH without any corresponding Physical Downlink Control Channel (PDCCH), the number of ACK/NACK bits of a carrier c carried in the current uplink sub-frame n can be determined from $B_c^{DL}$, where $B_c^{DL} = M_c$, $B_c^{DL}$ represents the number of downlink sub-frames on the carrier c for which ACK/NACK needs to be fed back in the current uplink sub-frame n, and $M_c$ represents a value determined from the number of downlink sub-frames in the set of downlink sub-frames on the carrier c associated with the current uplink sub-frame n, and the set of downlink sub-frames is composed of the downlink sub-frames on the carrier c determined from the set of indexes K associated with the current uplink sub-frame n indicated by the reference TDD uplink/downlink configuration of the carrier c.

However there is no a specific solution to determine $B_c^{DL}$ of each carrier yet in other scenarios, e.g., a scenario where a PUSCH has a corresponding PDCCH.

SUMMARY

An object of the invention is to provide a method of and apparatus for determining the number of ACK/NACK feedback bits so as to address the problem of how to determine $B_c^{DL}$ of carriers when multiple carriers with different TDD uplink/downlink configurations are aggregated for a UE or aggregated carriers comprise at least one Frequency Division Duplex (FDD) carrier and at least one TDD carrier, and if ACK/NACK is fed back over a PUSCH with a corresponding PDCCH including a DAI field (that is, the parameter $W_{DAI}^{UL}$ can be obtained to assist in determining the number of ACK/NACK feedback bits).

The object of the invention is attained in the following technical solutions:

A method of determining the number of ACK/NACK feedback bits, wherein when carriers with different TDD uplink/downlink configurations are aggregated for a UE or aggregated carriers comprise at least one Frequency Division Duplex (FDD) carrier and at least one TDD carrier, and if the UE feeds back ACK/NACK over a PUSCH with a corresponding PDCCH, the PDCCH including a DAI field, the method including:

judging whether there is a first category of carrier among carriers aggregated for a UE, wherein the first category of carrier refers to a carrier with a reference TDD uplink/downlink configuration being a first category of TDD uplink/downlink configuration and the first category of TDD uplink/downlink configuration refers to a TDD uplink/downlink configuration indicating a set of indexes, associated with an uplink sub-frame, in which the number of elements is larger than 4; or the first category of carrier refers to a carrier on which the number of downlink sub-frames for which ACK/NACK needs to be fed back among a set of downlink sub-frames is larger than 4, wherein the set of downlink sub-frames is determined according to a set of indexes, associated with an uplink sub-frame, indicated by a reference TDD uplink/downlink configuration of the carrier; wherein the reference TDD uplink/downlink configuration refers to a TDD uplink/downlink configuration for determining a relationship between a downlink sub-frame on the carrier and an uplink sub-frame in which ACK/NACK feedback information of the downlink sub-frame is transmitted;

if there is the first category of carrier, then determining by a first category of scheme the number of downlink sub-frames, on each carrier c aggregated for the UE, for which ACK/NACK needs to be fed back in the current uplink sub-frame;

if there is no first category of carrier, then determining by a second category of scheme the number of downlink sub-frames, on each carrier c aggregated for the UE, for which ACK/NACK needs to be fed back in the current uplink sub-frame; and determining the number of ACK/NACK feedback bits to be fed back in the current uplink sub-frame according to the number of downlink sub-frames on each carrier c for which ACK/NACK needs to be fed back in the current uplink sub-frame.

An apparatus for determining the number of ACK/NACK feedback bits, wherein when carriers with different TDD uplink/downlink configurations are aggregated for a UE or aggregated carriers comprise at least one Frequency Division Duplex (FDD) carrier and at least one TDD carrier, and if the UE feeds back ACK/NACK over a PUSCH with a corresponding PDCCH, the PDCCH including a DAI field, the apparatus including:

a carrier category judging module configured to judge whether there is a first category of carrier among carriers aggregated for a UE, wherein the first category of carrier refers to a carrier with a reference TDD uplink/downlink configuration being a first category of TDD uplink/downlink configuration and the first category of TDD uplink/downlink configuration refers to a TDD uplink/downlink configuration indicating a set of indexes, associated with an uplink sub-frame, in which the number of elements is larger than 4; or the first category of carrier refers to a carrier on which the number of downlink sub-frames for which ACK/NACK needs to be fed back among a set of downlink sub-frames is larger than 4, wherein the set of downlink sub-frames is determined according to a set of indexes, associated with an uplink sub-frame, indicated by a reference TDD uplink/downlink configuration of the carrier; wherein the reference TDD uplink/downlink configuration refers to a TDD uplink/downlink configuration for determining a relationship between a downlink sub-frame on the carrier and an uplink sub-frame in which ACK/NACK feedback information of the downlink sub-frame is transmitted;

a first feedback sub-frame number determining module configured, if there is the first category of carrier, to determine by a first category of scheme the number of downlink sub-frames, on each carrier c aggregated for the UE, for which ACK/NACK needs to be fed back in the current uplink sub-frame;

a second feedback sub-frame number determining module configured, if there is no first category of carrier, to determine by a second category of scheme the number of downlink sub-frames, on each carrier c aggregated for the UE, for which ACK/NACK needs to be fed back in the current uplink sub-frame; and a feedback bit number determining module configured to determine the number of ACK/NACK feedback bits to be fed back in the current uplink sub-frame according to the number of downlink sub-frames on each carrier c for which ACK/NACK needs to be fed back in the current uplink sub-frame.

When carriers with different TDD uplink/downlink configurations are aggregated for a UE or aggregated carriers comprise at least one Frequency Division Duplex (FDD) carrier and at least one TDD carrier, and if the UE feeds back ACK/NACK over a PUSCH with a corresponding PDCCH including a DAI field, the method according to the embodiment of the invention proposes a specific solution to determine $B_c^{DL}$ of the carriers so as to enable the system to operate normally in such an application scenario.

DETAILED DESCRIPTION OF THE EMBODIMENTS

Figure 1:
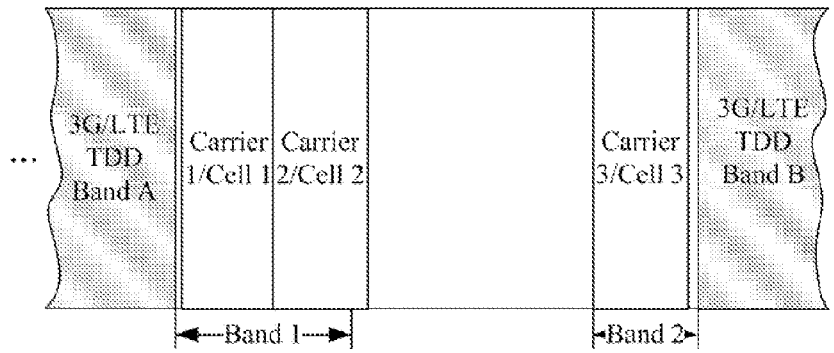
FIG. 1 is a schematic diagram of inter-band carrier aggregation.

For a UE with inter-band carrier aggregation, when carriers with different TDD uplink/downlink configurations are aggregated for the UE or the aggregated carriers comprise at least one Frequency Division Duplex (FDD) carrier and at least one TDD carrier, and if the UE feeds back ACK/NACK over a PUSCH with a corresponding PDCCH which includes a Downlink Assignment Index (DAI) field, embodiments of the invention provide a method of and apparatus for determining the number of ACK/NACK feedback bits for this case.

Prior to a description of the respective embodiments of the invention, firstly some technical features as referred to in the invention may be defined below:

A first category of carrier refers to a carrier with a reference TDD uplink/downlink configuration being a first category of TDD uplink/downlink configuration. Correspondingly the first category of TDD uplink/downlink configuration refers to a TDD uplink/downlink configuration indicating a set of indexes, associated with an uplink sub-frame, in which the number of elements is larger than 4. For example, there is a carrier with a reference TDD uplink/downlink configuration being the TDD uplink/downlink configuration 5, where the number of elements in a set of indexes K={4, 5, 6, 7, 8, 9, 11, 12, 13} associated with an uplink sub-frame indicated by the TDD uplink/downlink configuration 5 is 9.

Or,

The first category of carrier refers to a carrier on which the number of downlink sub-frames for which ACK/NACK needs to be fed back among a set of downlink sub-frames is larger than 4, wherein the set of downlink sub-frames is determined according to a set of indexes, associated with an uplink sub-frame, indicated by a reference TDD uplink/downlink configuration of the carrier. The number of downlink sub-frames for which ACK/NACK needs to be fed back can be defined as the number of all the downlink sub-frames (including special sub-frames) in the set of downlink sub-frames on the carrier determined by the set of indexes associated with an uplink sub-frame, wherein the set of indexes is indicated by the reference TDD uplink/downlink configuration of the carrier; or the number of downlink sub-frames for which ACK/NACK needs to be fed back can be defined as the number of all the downlink sub-frames, other than special sub-frames for which no ACK/NACK needs to be fed back, in the set of downlink sub-frames on the carrier determined by the set of indexes associated with an uplink sub-frame, wherein the set of indexes is indicated by the reference TDD uplink/downlink configuration of the carrier, where the special sub-frames for which no ACK/NACK needs to be fed back refer to special sub-frames with a downlink normal CP and corresponding to special sub-frame configurations 0 and 5 and special sub-frames with a downlink extended CP and corresponding to special sub-frame configurations 0 and 4. For example, there is a carrier with a reference TDD uplink/downlink configuration which is the TDD uplink/downlink configuration 5 and with a TDD uplink/downlink configuration indicated in an SIB1 as other than the TDD uplink/downlink configuration 0. Assumed that the reference TDD uplink/downlink configuration of the carrier is the TDD uplink/downlink configuration 5 and the TDD uplink/downlink configuration indicated in the SIB1 is the TDD uplink/downlink configuration 1, where the number of downlink sub-frames in a set of downlink sub-frames on the carrier determined by the set of indexes associated with an uplink sub-frame indicated by the reference TDD uplink/downlink configuration of the carrier is 6.

In a practical application, the definition of the first category of carrier can be specified in a standard or agreed on in advance between the UE and an eNB, and the invention may not be limited to either of the definitions above.

The reference TDD uplink/downlink configuration of a carrier refers to a TDD uplink/downlink configuration by which a relationship (i.e., DL HARQ timing) is determined between a downlink sub-frame on the carrier and an uplink sub-frame in which ACK/NACK feedback information of the downlink sub-frame is transmitted.

The reference TDD uplink/downlink configuration of a PCC refers to a TDD uplink/downlink configuration notified to the PCC in an SIB1.

The reference TDD uplink/downlink configuration of an SCC refers to a TDD uplink/downlink configuration determined from TDD uplink/downlink configurations respectively notified to the SCC and the PCC in SIB1, particularly as specified in the communication standard, so a repeated description thereof may be omitted here.

$B_c^{DL}$ represents the number of downlink sub-frames on a carrier c for which ACK/NACK needs to be fed back in the current uplink sub-frame.

$M_c$ represents the number of all the downlink sub-frames (including special sub-frames) in the set of downlink sub-frames on the carrier c determined by the set of indexes, associated with the current uplink sub-frame, indicated by the reference TDD uplink/downlink configuration of the carrier c; or $M_c$ represents the number of downlink sub-frames, for which ACK/NACK needs to be fed back, in the set of downlink sub-frames on the carrier c determined by the set of indexes, associated with the current uplink sub-frame, indicated by the reference TDD uplink/downlink configuration of the carrier c. If the set of downlink sub-frames on the carrier c determined by the set of indexes, associated with the current uplink sub-frame, indicated by the reference TDD uplink/downlink configuration of the carrier c precludes the special sub-frames which correspond to special sub-frame configurations 0 and 5 and are with a downlink normal CP or the special sub-frames which correspond to special sub-frame configurations 0 and 4 and are with a downlink extended CP, then $M_c=M_c^*$; otherwise, $M_c=M_c^*-A$, where A represents the number of such special sub-frames in the set of downlink sub-frames, and $M_c^*$ represents the number of downlink sub-frames in the set of downlink sub-frames.

$W_{DAI}^{UL}$ represents a value indicated in a DAI field in a PDCCH corresponding to a PUSCH of the current uplink sub-frame.

U represents the maximum of $U_c$ corresponding to the respective carriers aggregated for the UE.

For the UE side, $U_c$ represents the total number of downlink sub-frames in which PDSCHs are received and downlink sub-frames in which PDCCHs indicating Semi-Persistent Scheduling (SPS) resource release are received by the UE among the $M_c$ downlink sub-frames on the carrier c associated with the current uplink sub-frame.

For the eNB side, $U_c$ represents the total number of downlink sub-frames in which PDSCHs are transmitted and downlink sub-frames in which PDCCHs indicating SPS resource release are transmitted by the eNB among the $M_c$ downlink sub-frames on the carrier c associated with the current uplink sub-frame.

Figure 2:
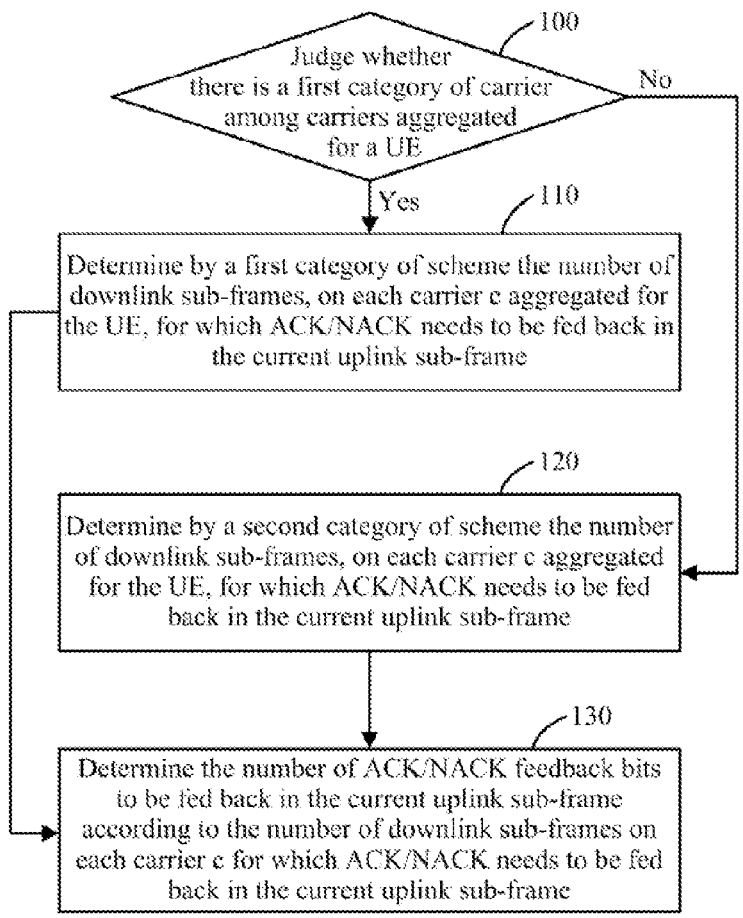
FIG. 2 is a flow chart of a method according to an embodiment of the invention.

Based upon the application scenario above, an implementation of a method of determining the number of ACK/NACK feedback bits according to an embodiment of the invention is as illustrated in FIG. 2, where the method includes the following operations:

Operation 100: judge whether there is a first category of carrier among carriers aggregated for a UE.

If there is the first category of carrier, then operation 110 is performed: determine by a first category of scheme the number of downlink sub-frames, on each carrier c aggregated for the UE, for which ACK/NACK needs to be fed back in the current uplink sub-frame.

If there is no first category of carrier, then the operation 120 is performed: determine by a second category of scheme the number of downlink sub-frames, on each carrier c aggregated for the UE, for which ACK/NACK needs to be fed back in the current uplink sub-frame.

The operation 120 can be performed particularly by obtaining $W_{DAI}^{UL}$, and $M_c$ of each carrier c aggregated for the UE; and determining the number of downlink sub-frames $B_c^{DL}=\min(W_{DAI}^{UL}, M_c)$, on each carrier c aggregated for the UE, for which ACK/NACK needs to be fed back in the current uplink sub-frame.

Operation 130: determine the number of ACK/NACK feedback bits to be fed back in the current uplink sub-frame according to the number of downlink sub-frames on each carrier c for which ACK/NACK needs to be fed back in the current uplink sub-frame.

Operation 130 can be performed particularly as follows: the UE determines, from $B_c^{DL}$ of the carrier c, the number of ACK/NACK feedback bits on the carrier c to be fed back in the current uplink sub-frame, and further determine the total number of ACK/NACK feedback bits to be fed back in the current uplink sub-frame. For the carrier c with a single codeword transmission mode or a multi-codeword transmission mode and with spatial bundling, the number of ACK/NACK feedback bits thereof to be fed back in the current uplink sub-frame is $O_c^{ACK}=B_c^{DL}$, and for the carrier c with a multi-codeword transmission mode and without spatial bundling, the number of ACK/NACK feedback bits thereof to be fed back in the current uplink sub-frame is $O_c^{ACK}=2B_c^{DL}$.

When carriers with different TDD uplink/downlink configurations are aggregated for a UE or aggregated carriers comprise at least one Frequency Division Duplex (FDD) carrier and at least one TDD carrier, and if the UE feeds back ACK/NACK over a PUSCH with a corresponding PDCCH which includes a DAI field, the method according to the embodiment of the invention proposes a specific solution to determine $B_c^{DL}$ of the carrier so as to enable the system to operate normally in such an application scenario.

The method according to the embodiment of the invention above can be applicable to both the UE side and the eNB side.

For the UE side, after the number of ACK/NACK feedback bits to be fed back in the current uplink sub-frame is determined by the method according to the embodiment of the invention, corresponding ACK/NACK information can thereby be carried over a PUSCH of the current sub-frame and fed back to the eNB.

For the eNB side, after the number of ACK/NACK feedback bits to be fed back in the current uplink sub-frame is determined by the method according to the embodiment of the invention, corresponding ACK/NACK information can thereby be obtained over a PUSCH of the current sub-frame.

The operation 110 can be performed particularly by determining, from at least one of $M_c$, $W_{DAI}^{UL}$ and $U_c$, the number of downlink sub-frames, on each carrier c aggregated for the UE, for which ACK/NACK needs to be fed back in the current uplink sub-frame. This can be performed in any one of the following schemes:

Scheme 1:

Operation 110 is performed particularly by obtaining $M_c$ of each carrier c and determining, from $M_c$, the number $B_c^{DL}$ of downlink sub-frames, on each carrier c aggregated for the UE, for which ACK/NACK needs to be fed back in the current uplink sub-frame, to be $B_c^{DL}=M_c$.

For the carrier c, $M_c$ can be determined from the reference TDD uplink/downlink configuration of the carrier c in Table 2.

In the scheme 1, for the respective carriers c aggregated for the UE, $B_c^{DL}$ is determined from respective $M_c$. When $B_c^{DL}$ is determined, the UE doesn't need to take into account the number of actually received downlink sub-frames and the eNB doesn't need to take into account the number of actually transmitted downlink sub-frames, so $B_c^{DL}$ determined by the UE side can be ensured the same as that determined by the UE side to thereby ensure reliability of data transmission.

Scheme 2:

Operation 110 is performed particularly by obtaining $W_{DAI}^{UL}$ and U, and $M_c$ of each carrier c and determining the number $B_c^{DL}$ of downlink sub-frames, on each carrier c aggregated for the UE, for which ACK/NACK needs to be fed back in the current uplink sub-frame, to be $B_c^{DL}=\min(W_{DAI}^{UL}+4\lfloor(U-W_{DAI}^{UL})/4\rfloor, M_c)$.

In the scheme 2, for the each carrier c aggregated for the UE, $B_c^{DL}$ is determined in the same calculation formula to thereby facilitate popularized standardization of $B_c^{DL}$.

Scheme 3:

Operation 110 is performed particularly by obtaining $W_{DAI}^{UL}$, $U_c$ of each carrier c and $M_c$ of each carrier c and determining the number $B_c^{DL}$ of downlink sub-frames, on each carrier c aggregated for the UE, for which ACK/NACK needs to be fed back in the current uplink sub-frame, to be $B_c^{DL}=W_{DAI}^{UL}+4\lfloor(U_c-W_{DAI}^{UL})/4\rfloor$.

With the scheme 3, preferably it shall be ensured by the eNB side that the largest number $S_1$ of scheduling sub-frames on a first set of carriers and the largest number $S_2$ of scheduling sub-frames on a second set of carriers satisfy: $\mod(S_1-S_2,4)=0$ or $4\lfloor(S_1-1)/4\rfloor \leq S_1-S_2 \leq S_1$ or $S_2 <= \mod(S_1-1,4)+1$ or $S_2 >= S_1$.

In the scheme 3, for the each carrier c aggregated for the UE, $B_c^{DL}$ is determined in the same calculation formula to thereby facilitate popularized standardization of $B_c^{DL}$. Moreover $B_c^{DL}$ determined in the formula provided in the scheme 3 agrees with the real number of scheduling sub-frames, so ACK/NACK can be transmitted over a PUSCH more effectively.

In a particular implementation of the operation 110, the carriers aggregated for the UE can be further divided into a first set of carriers and a second set of carriers. The first set of carriers is the first category of carriers or such a part of carriers in the first category of carriers that are predefined or that are determined in signaling configuration information, and the second set of carriers is the other carriers than the first category of carriers among the carriers aggregated for the UE. The number of the downlink sub-frames, on each carrier c in each set of carriers, for which ACK/NACK needs to be fed back in the current uplink sub-frame is determined respectively. Particularly the operation 110 can be performed in any one of the following schemes:

Scheme 4:

The operation 110 is performed particularly by obtaining $M_c$ of each carrier c in the first set of carriers and determining the number $B_c^{DL}$ of downlink sub-frames, on each carrier c in the first set of carriers aggregated for the UE, for which ACK/NACK needs to be fed back in the current uplink sub-frame, to be $B_c^{DL}=M_c$; and obtaining $W_{DAI}^{UL}$, and $M_c$ of each carrier c in the second set of carriers and determining the number $B_c^{DL}$ of downlink sub-frames, on each carrier c in the second set of carriers aggregated for the UE, for which ACK/NACK needs to be fed back in the current uplink sub-frame, to be $B_c^{DL}=\min(W_{DAI}^{UL}, M_c)$.

With the scheme 4, preferably $W_{DAI}^{UL}$ shall be determined from the largest number of scheduling sub-frames on the second set of carriers.

Scheme 5:

The operation 110 is performed particularly by obtaining $M_c$ of each carrier c in the first set of carriers and determining the number $B_c^{DL}$ of downlink sub-frames, on each carrier c in the first set of carriers aggregated for the UE, for which ACK/NACK needs to be fed back in the current uplink sub-frame, to be $B_c^{DL}=M_c$; and obtaining $W_{DAI}^{UL}$ and determining the number $B_c^{DL}$ of downlink sub-frames, on each carrier c in the second set of carriers aggregated for the UE, for which ACK/NACK needs to be fed back in the current uplink sub-frame, to be $B_c^{DL}=W_{DAI}^{UL}$.

With the scheme 5, preferably $W_{DAI}^{UL}$ shall be determined from the largest number of scheduling sub-frames on the second set of carriers.

Scheme 6:

The operation 110 is performed particularly by obtaining $W_{DAI}^{UL}$, and $U_c$ of each carrier c in the first set of carriers and determining the number $B_c^{DL}$ of downlink sub-frames, on each carrier c in the first set of carriers aggregated for the UE, for which ACK/NACK needs to be fed back in the current uplink sub-frame, to be $B_c^{DL}=W_{DAI}^{UL}+4\lfloor(U_c-W_{DAI}^{UL})/4\rfloor$; and obtaining $M_c$ of each carrier c in the second set of carriers and determining the number $B_c^{DL}$ of downlink sub-frames, on each carrier c in the second set of carriers aggregated for the UE, for which ACK/NACK needs to be fed back in the current uplink sub-frame, to be $B_c^{DL}=M_c$.

With the scheme 6, preferably $W_{DAI}^{UL}$ shall be determined from the largest number of scheduling sub-frames on the first set of carriers.

Scheme 7:

The operation 110 is performed particularly by obtaining $W_{DAI}^{UL}$ and U and determining the number $B_c^{DL}$ of downlink sub-frames, on each carrier c in the first set of carriers aggregated for the UE, for which ACK/NACK needs to be fed back in the current uplink sub-frame, to be $B_c^{DL}=W_{DAI}^{UL}+4\lfloor(U-W_{DAI}^{UL})/4\rfloor$; and obtaining $M_c$ of each carrier c in the second set of carriers and determining the number $B_c^{DL}$ of downlink sub-frames, on each carrier c in the second set of carriers aggregated for the UE, for which ACK/NACK needs to be fed back in the current uplink sub-frame, to be $B_c^{DL}=M_c$.

With the scheme 7, preferably $W_{DAI}^{UL}$ shall be determined from the largest number of scheduling sub-frames on the first set of carriers.

Scheme 8:

The operation 110 is performed particularly by obtaining $W_{DAI}^{UL}$, and $U_c$ of each carrier c in the first set of carriers and determining the number $B_c^{DL}$ of downlink sub-frames, on each carrier c in the first set of carriers aggregated for the UE, for which ACK/NACK needs to be fed back in the current uplink sub-frame, to be $B_c^{DL}=W_{DAI}^{UL}+4\lfloor(U_c-W_{DAI}^{UL})/4\rfloor$; and obtaining $M_c$ of each carrier c in the second set of carriers and determining the number $B_c^{DL}$ of downlink sub-frames, on each carrier c in the second set of carriers aggregated for the UE, for which ACK/NACK needs to be fed back in the current uplink sub-frame, to be $B_c^{DL}=\min(W_{DAI}^{UL}, M_c)$.

With the scheme 8, preferably it shall be ensured by the eNB side that the largest number $S_1$ of scheduling sub-frames on the first set of carriers and the largest number $S_2$ of scheduling sub-frames on the second set of carriers satisfy: $\mod(S_1-S_2,4)=0$ or $4\lfloor(S_1-1)/4\rfloor \leq S_1-S_2 \leq S_1$ or $S_2 \leq \mod(S_1-1,4)+1$ or $S_2 \geq S_1$.

Scheme 9:

The operation 110 is performed particularly by obtaining $W_{DAI}^{UL}$, and $U_c$ of each carrier c in the first set of carriers and determining the number $B_c^{DL}$ of downlink sub-frames, on each carrier c in the first set of carriers aggregated for the UE, for which ACK/NACK needs to be fed back in the current uplink sub-frame, to be $B_c^{DL}=W_{DAI}^{UL}+4\lceil(U_c-W_{DAI}^{UL})/4\rceil$; and determining the number $B_c^{DL}$ of downlink sub-frames, on each carrier c in the second set of carriers aggregated for the UE, for which ACK/NACK needs to be fed back in the current uplink sub-frame, to be $B_c^{DL}=W_{DAI}^{UL}$.

With the scheme 9, preferably it shall be ensured by the eNB side that the largest number $S_1$ of scheduling sub-frames on the first set of carriers and the largest number $S_2$ of scheduling sub-frames on the second set of carriers satisfy: $\mod(S_1-S_2,4)=0$ or $4\lfloor(S_1-1)/4\rfloor \leq S_1-S_2 \leq S_1$ or $S_2 \leq \mod(S_1-1,4)+1$ or $S_2 \geq S_1$.

Scheme 10:

The operation 110 is performed particularly by obtaining $W_{DAI}^{UL}$ and U and determining the number $B_c^{DL}$ of downlink sub-frames, on each carrier c in the first set of carriers aggregated for the UE, for which ACK/NACK needs to be fed back in the current uplink sub-frame, to be $B_c^{DL}=W_{DAI}^{UL}+4\lceil(U-W_{DAI}^{UL})/4\rceil$; and obtaining $M_c$ of each carrier c in the second set of carriers and determining the number $B_c^{DL}$ of downlink sub-frames, on each carrier c in the second set of carriers aggregated for the UE, for which ACK/NACK needs to be fed back in the current uplink sub-frame, to be $B_c^{DL}=\min(W_{DAI}^{UL}, M_c)$.

With the scheme 10, preferably it shall be ensured by the eNB side that the largest number $S_1$ of scheduling sub-frames on the first set of carriers and the largest number $S_2$ of scheduling sub-frames on the second set of carriers satisfy: $\mod(S_1-S_2,4)=0$ or $4\lfloor(S_1-1)/4\rfloor \leq S_1-S_2 \leq S_1$ or $S_2 \leq \mod(S_1-1,4)+1$ or $S_2 \geq S_1$.

Scheme 11:

The operation 110 is performed particularly by obtaining $W_{DAI}^{UL}$ and U and determining the number $B_c^{DL}$ of downlink sub-frames, on each carrier c in the first set of carriers aggregated for the UE, for which ACK/NACK needs to be fed back in the current uplink sub-frame, to be $B_c^{DL}=W_{DAI}^{UL}+4\lceil(U-W_{DAI}^{UL})/4\rceil$; and determining the number of downlink sub-frames $B_c^{DL}$, on each carrier c in the second set of carriers aggregated for the UE, for which ACK/NACK needs to be fed back in the current uplink sub-frame, to be $B_c^{DL}=W_{DAI}^{UL}$.

With the scheme 11, preferably it shall be ensured by the eNB side that the largest number $S_1$ of scheduling sub-frames on the first set of carriers and the largest number $S_2$ of scheduling sub-frames on the second set of carriers satisfy: $\mod(S_1-S_2,4)=0$ or $4\lfloor(S_1-1)/4\rfloor \leq S_1-S_2 \leq S_1$ or $S_2 \leq \mod(S_1-1,4)+1$ or $S_2 \geq S_1$.

In the above scheme 4 to the scheme 11, $B_c^{DL}$ are determined by different methods respectively for the first set of carriers and the second set of carriers, so that the first set of carriers and the second set of carriers are independent from each other. $B_c^{DL}$ determined by the UE side for one of the sets of carriers may disagree with the $B_c^{DL}$ determined by eNB side for this set of carriers, which doesn't occur any influence on transmission of ACK/NACK for the other set of carriers.

Scheme 12:

The operation 110 is performed particularly by obtaining $W_{DAI}^{UL}$ and U and determining the number $B_c^{DL}$ of downlink sub-frames, on each carrier c in the first set of carriers aggregated for the UE, for which ACK/NACK needs to be fed back in the current uplink sub-frame, to be $B_c^{DL}=W_{DAI}^{UL}+4\lceil(U-W_{DAI}^{UL})/4\rceil$; and obtaining $M_c$ of each carrier c in the second set of carriers, and determining the number $B_c^{DL}$ of downlink sub-frames, on each carrier c in the second set of carriers aggregated for the UE, for which ACK/NACK needs to be fed back in the current uplink sub-frame, to be $B_c^{DL}=\min(W_{DAI}^{UL}, M_c)$ if $U \leq W_{DAI}^{UL}$ or to be $B_c^{DL}=M_c$ otherwise.

Scheme 13:

The operation 110 is performed particularly by obtaining $W_{DAI}^{UL}$ and U and determining the number $B_c^{DL}$ of downlink sub-frames, on each carrier c in the first set of carriers aggregated for the UE, for which ACK/NACK needs to be fed back in the current uplink sub-frame, to be $B_c^{DL}=W_{DAI}^{UL}+4\lceil(U-W_{DAI}^{UL})/4\rceil$; and if $U \leq W_{DAI}^{UL}$, determining the number $B_c^{DL}$ of downlink sub-frames, on each carrier c in the second set of carriers aggregated for the UE, for which ACK/NACK needs to be fed back in the current uplink sub-frame, to be $B_c^{DL}=W_{DAI}^{UL}$, or otherwise obtaining $M_c$ of each carrier c in the second set of carriers, and determining the number of downlink sub-frames $B_c^{DL}$, on each carrier c in the second set of carriers aggregated for the UE, for which ACK/NACK needs to be fed back in the current uplink sub-frame, to be $B_c^{DL}=M_c$.

Scheme 14:

The operation 110 is performed particularly by obtaining $W_{DAI}^{UL}$ and U and determining the number $B_c^{DL}$ of downlink sub-frames, on each carrier c in the first set of carriers aggregated for the UE, for which ACK/NACK needs to be fed back in the current uplink sub-frame, to be $B_c^{DL}=W_{DAI}^{UL}+4\lceil(U-W_{DAI}^{UL})/4\rceil$; and if $U \leq W_{DAI}^{UL}$, determining the number $B_c^{DL}$ of downlink sub-frames, on each carrier c in the second set of carriers aggregated for the UE, for which ACK/NACK needs to be fed back in the current uplink sub-frame, to be $B_c^{DL}=W_{DAI}^{UL}+4\lceil(U-W_{DAI}^{UL})/4\rceil$, or otherwise obtaining $M_c$ of each carrier c in the second set of carriers, and determining the number $B_c^{DL}$ of downlink sub-frames, on each carrier c in the second set of carriers aggregated for the UE, for which ACK/NACK needs to be fed back in the current uplink sub-frame, to be $B_c^{DL}=M_c$.

In the above scheme 12 to the scheme 14, $B_c^{DL}$ are determined by different methods respectively for the first set of carriers and the second set of carriers, so that the first set of carriers and the second set of carriers have low correlation with each other. $B_c^{DL}$ determined by the UE side for one of the sets of carriers may disagree with the $B_c^{DL}$ determined by eNB side for this set of carriers, the probability of an influence upon transmission of ACK/NACK for the other set of carriers is lowered as much as possible.

If all the carriers aggregated for the UE are the first category of carriers, then $B_c^{DL}$ of the respective carriers c can be determined particularly in any one of the schemes 1 to 3 above. Alternatively the first category of carriers can be determined as the first set of carriers, and at this time the second set of carriers is a null set, and $B_c^{DL}$ of the respective carriers c can be determined in any one of the schemes 4 to 14 above, and particularly $B_c^{DL}$ of the first category of carriers c can be determined as done for the first set of carriers c in the schemes 4 to 14 without determining $B_c^{DL}$ of the second set of carriers. Alternatively, preferably the first set of carriers is such a part of carriers in the first category of carriers that are predefined or that are determined in signaling configuration information, and the second set of carriers is the other carriers than the first set of carriers among the carriers aggregated for the UE, and $B_c^{DL}$ of the respective carriers c are determined in any of the schemes 4 to 14 above, and particularly $B_c^{DL}$ of each carrier c in the first set of carriers are determined as done for the first set of carriers c in the schemes 4 to 14 and B of each carrier c in the second set of carriers are determined as done for the second set of carriers c in the schemes 4 to 14, respectively. The predetermined rule is a rule predefined between the UE side and the eNB side, for example, the predetermined rule indicates that a PCC is the first set of carrier, or SCCs are the first set of carriers, or carriers with the highest or lowest $M_c$ are the first set of carrier, or the other carriers than the carriers with the highest or lowest $M_c$ among the carriers aggregated for the UE are the first set of carriers, and when there are a plurality of carriers with the same $M_c$, at least one of them can be further selected according to carrier indexes to be the first set of carrier, for example, in an order of the ascending or descending carrier indexes. Particularly the notification signaling can be PDCCH signaling or Medium Access Control (MAC) signaling or Radio Resource Control (RRC) signaling.

Before the operation 110, the method according to the embodiment of the invention can further include the following operations:

judge whether $M_c$ of the carrier c is 0, and if $M_c=0$, then the number of downlink carriers on the carrier c for which ACK/NACK needs to be fed back in the current uplink sub-frame is determined to be 0; otherwise, dependent upon the result of judgment in the operation 100 above, perform the operation 110 in which the number of downlink carriers on the carrier c for which ACK/NACK needs to be fed back in the current uplink sub-frame is determined by any one of the schemes above, or perform the operation 120.

The method according to the embodiment of the invention will be described below in details with reference to the drawings and particular application scenarios thereof.

Figure 3:
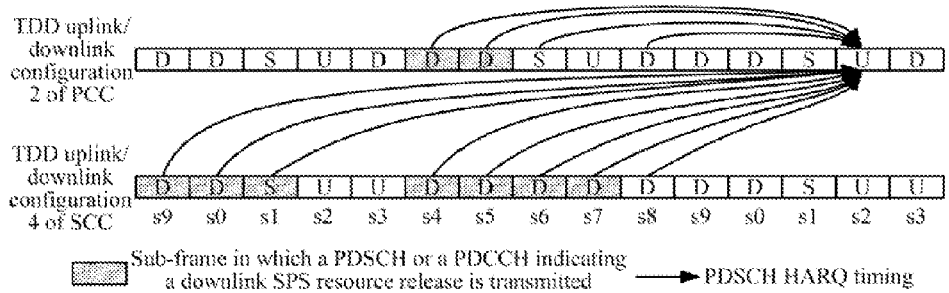
FIG. 3 is a schematic diagram of resources at the eNB side in an application scenario according to an embodiment of the invention.
Figure 4:
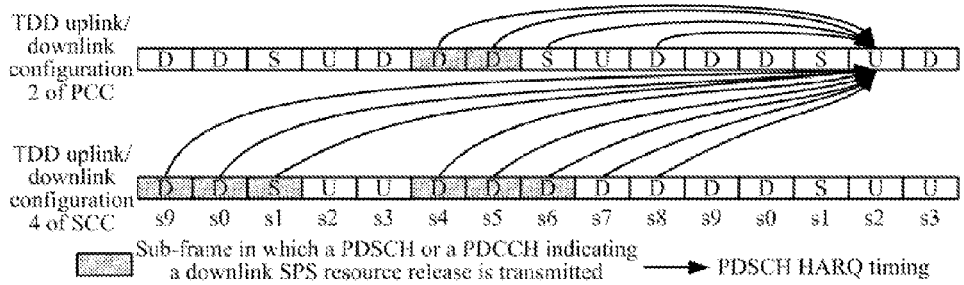
FIG. 4 is a schematic diagram of resources at the UE side in an application scenario according to an embodiment of the invention.

In an application scenario, when carriers with different TDD uplink/downlink configurations are aggregated for a UE or the aggregated carriers comprise at least one Frequency Division Duplex (FDD) carrier and at least one TDD carrier, the UE feeds back ACK/NACK over a PUSCH with a corresponding PDCCH in a sub-frame 2, the PDCCH includes a DAI field. A TDD uplink/downlink configuration of a PCC notified in SIB1 information is the configuration 2, and a TDD uplink/downlink configuration of an SCC notified in SIB1 information is the configuration 4. A reference TDD uplink/downlink configuration of the PCC is thereby determined as the configuration 2, and a reference TDD uplink/downlink configuration of the SCC is determined as the configuration 5. Moreover special sub-frames of the PCC and the SCC are neither the special sub-frame configurations 0 and 6 with a normal CP nor the special sub-frame configurations 0 and 4 with an extended CP. Correspondingly the number of downlink sub-frames in a set of downlink sub-frames on the PCC associated with the current uplink sub-frame is $M_{pcc}*=4$, where $M_{pcc}=M_{pcc}*$ (the meaning of $M_{pcc}$ of the PCC is the same as the meaning of $M_c$ of the carrier c). The number of downlink sub-frames in the set of downlink sub-frames on the SCC associated with the current uplink sub-frame is $M_{scc}*=8>4$, where $M_{scc}*=M_{scc}$ (the meaning of $M_{scc}*$ of the SCC is the same as the meaning of $M_c$ of the carrier c). FIG. 3 illustrates a condition of actual scheduling at the eNB side. At the eNB side, $U_{pcc}=2$, $U_{scc}=7$ and $U=\max(U_{pcc}, U_{scc})=7$. FIG. 4 illustrates a condition of actual reception at the UE side. At the UE side, $U_{pcc}=2$, $U_{scc}=6$ and $U=\max(U_{pcc}, U_{scc})=6$. Based upon such an application scenario, the SCC is the first category of carrier and determined to be the first set of carrier, and the PCC is the second set of carrier.

If the number of sub-frames on a carrier for which ACK/NACK needs to be fed back in the current uplink sub-frame is determined by the scheme 1 at the UE side and the eNB side, then the value of $W_{DAI}^{UL}$ indicated by the eNB in the DAI may not be taken into account; and the number of sub-frames on the PCC for which ACK/NACK needs to be fed back in the current uplink sub-frame is $B_{pcc}^{DL}=M_{pcc}=4$, and the number of sub-frames on the SCC for which ACK/NACK needs to be fed back in the current uplink sub-frame is $B_{scc}^{DL}=M_{scc}=8$.

If the number of sub-frames on a carrier for which ACK/NACK needs to be fed back in the current uplink sub-frame is determined by the scheme 2 at the UE side and the eNB side, and assumed that $W_{DAI}^{UL}=3$ is indicated by the eNB in the DAI (preferably $W_{DAI}^{UL}$ is determined jointly by conditions of scheduling on the PCC and the SCC, for example, $W_{DAI}^{UL}$ is a value which is a largest one of the numbers of scheduling sub-frames on the PCC and the SCC or is larger than the largest one of the numbers of scheduling sub-frames on the PCC and the SCC), then the number of sub-frames on the PCC for which ACK/NACK needs to be fed back in the current uplink sub-frame is $B_{pcc}^{DL}=\min(W_{DAI}^{UL}+4\lceil(U-W_{DAI}^{UL})/4\rceil, M_{pcc})=M_{pcc}=4$, and the number of sub-frames on the SCC for which ACK/NACK needs to be fed back in the current uplink sub-frame is $B_{scc}^{DL}=\min(W_{DAI}^{UL}+4\lceil(U-W_{DAI}^{UL})/4\rceil, M_{scc})=M_{scc}=8$.

If the number of sub-frames on a carrier for which ACK/NACK needs to be fed back in the current uplink sub-frame is determined by the scheme 3 at the UE side and the eNB side, and assumed that $W_{DAI}^{UL}=3$ is indicated by the eNB in the DAI (preferably $W_{DAI}^{UL}$ is determined jointly by conditions of scheduling on the PCC and the SCC, for example, $W_{DAI}^{UL}$ is a value which is a largest one of the numbers of scheduling sub-frames on the PCC and the SCC or is larger than the largest one of the numbers of scheduling sub-frames on the PCC and the SCC), and $S_2=2$ on the PCC and $S_1=7$ on the SCC satisfy $4\lfloor(S_1-1)/4\rfloor \le S_1-S_2 \le S_1$ or $S_2 <= \mod(S_1-1,4)+1$, then the number of sub-frames on the PCC for which ACK/NACK needs to be fed back in the current uplink sub-frame is $B_{pcc}^{DL}=W_{DAI}^{UL}+4\lceil(U_{pcc}-W_{DAI}^{UL})/4\rceil=3$, and the number of sub-frames on the SCC for which ACK/NACK needs to be fed back in the current uplink sub-frame is $B_{scc}^{DL}=W_{DAI}^{UL}+4\lceil(U_{scc}-W_{DAI}^{UL})/4\rceil=7$.

If the number of sub-frames on a carrier for which ACK/NACK needs to be fed back in the current uplink sub-frame is determined by the scheme 4 at the UE side and the eNB side, and assumed that $W_{DAI}^{UL}=2$ is indicated by the eNB in the DAI (preferably $W_{DAI}^{UL}$ is determined by a condition of scheduling on the PCC, for example, $W_{DAI}^{UL}$ is a value which is the actual number of scheduling sub-frames on the PCC or is larger than the actual number of scheduling sub-frames on the PCC), then the number of sub-frames on the PCC for which ACK/NACK needs to be fed back in the current uplink sub-frame is $B_{pcc}^{DL}=\min(W_{DAI}^{UL}, M_{pcc})=2$, and the number of sub-frames on the SCC for which ACK/NACK needs to be fed back in the current uplink sub-frame is $B_{scc}^{DL}=M_{scc}=8$.

If the number of sub-frames on a carrier for which ACK/NACK needs to be fed back in the current uplink sub-frame is determined by the scheme 5 at the UE side and the eNB side, and assumed that $W_{DAI}^{UL}=2$ is indicated by the eNB in the DAI (preferably $W_{DAI}^{UL}$ is determined by a condition of scheduling on the PCC, for example, $W_{DAI}^{UL}$ is a value which is the actual number of scheduling sub-frames on the PCC or is larger than the actual number of scheduling sub-frames on the PCC), then the number of sub-frames on the PCC for which ACK/NACK needs to be fed back in the current uplink sub-frame is $B_{pcc}^{DL}=W_{DAI}^{UL}2$, and the number of sub-frames on the SCC for which ACK/NACK needs to be fed back in the current uplink sub-frame is $B_{scc}^{DL}=M_{scc}=8$.

If the number of sub-frames on a carrier for which ACK/NACK needs to be fed back in the current uplink sub-frame is determined by the scheme 6 at the UE side and the eNB side, and assumed that $W_{DAI}^{UL}=3$ is indicated by the eNB in the DAI (preferably $W_{DAI}^{UL}$ is determined by a condition of scheduling on the SCC, for example, $W_{DAI}^{UL}$ is a value which is the actual number of scheduling sub-frames on the SCC or is larger than the actual number of scheduling sub-frames on the SCC), then the number of sub-frames on the PCC for which ACK/NACK needs to be fed back in the current uplink sub-frame is $B_{pcc}^{DL}=M_{pcc}=4$, and the number of sub-frames on the SCC for which ACK/NACK needs to be fed back in the current uplink sub-frame is $B_{scc}^{DL}=W_{DAI}^{UL}+4\lceil(U_{scc}-W_{DAI}^{UL})/4\rceil=7$.

If the number of sub-frames on a carrier for which ACK/NACK needs to be fed back in the current uplink sub-frame is determined by the scheme 7 at the UE side and the eNB side, and assumed that $W_{DAI}^{UL}=3$ is indicated by the eNB in the DAI (preferably $W_{DAI}^{UL}$ is determined by a condition of scheduling on the SCC, for example, $W_{DAI}^{UL}$ is a value which is the actual number of scheduling sub-frames on the SCC or is larger than the actual number of scheduling sub-frames on the SCC), then the number of sub-frames on the PCC for which ACK/NACK needs to be fed back in the current uplink sub-frame is $B_{pcc}^{DL}=M_{pcc}=4$, and the number of sub-frames on the SCC for which ACK/NACK needs to be fed back in the current uplink sub-frame is $B_{scc}^{DL}=W_{DAI}^{UL}+4\lceil(U-W_{DAI}^{UL})/4\rceil=7$.

If the number of sub-frames on a carrier for which ACK/NACK needs to be fed back in the current uplink sub-frame is determined by the scheme 8 at the UE side and the eNB side, and assumed that $W_{DAI}^{UL}=3$ is indicated by the eNB in the DAI (preferably $W_{DAI}^{UL}$ is determined jointly by conditions of scheduling on the PCC and the SCC, for example, $W_{DAI}^{UL}$ is a value which is the largest one of the numbers of scheduling sub-frames on the PCC and the SCC or is larger than the largest one of the numbers of scheduling sub-frames on the PCC and the SCC), and $S_2=2$ on the PCC and $S_1=7$ on the SCC satisfy $4\lfloor(S_1-1)/4\rfloor \leq S_1-S_2 \leq S_1$ or $S_2 <= \mod(S_1-1,4)+1$, then the number of sub-frames on the PCC for which ACK/NACK needs to be fed back in the current uplink sub-frame is $B_{scc}^{DL}=\min(W_{DAI}^{UL}, M_{pcc})=3$, and the number of sub-frames on the SCC for which ACK/NACK needs to be fed back in the current uplink sub-frame is $B_{scc}^{DL}=W_{DAI}^{UL}+4\lceil(U_{scc}-W_{DAI}^{UL})/4\rceil=7$.

If the number of sub-frames on a carrier for which ACK/NACK needs to be fed back in the current uplink sub-frame is determined by the scheme 9 at the UE side and the eNB side, and assumed that $W_{DAI}^{UL}=3$ is indicated by the eNB in the DAI (preferably $W_{DAI}^{UL}$ is determined jointly by conditions of scheduling on the PCC and the SCC, for example, $W_{DAI}^{UL}$ is a value which is the largest one of the numbers of scheduling sub-frames on the PCC and the SCC or larger than the largest one of the numbers of scheduling sub-frames on the PCC and the SCC), and $S_2=2$ on the PCC and $S_1=7$ on the SCC satisfy $4\lfloor(S_1-1)/4\rfloor \leq S_1-S_2 \leq S_1$ or $S_2 <= \mod(S_1-1,4)+1$, then the number of sub-frames on the PCC for which ACK/NACK needs to be fed back in the current uplink sub-frame is $B_{pcc}^{DL}=\min(W_{DAI}^{UL}, M_{pcc})=3$, and the number of sub-frames on the SCC for which ACK/NACK needs to be fed back in the current uplink sub-frame is $B_{scc}^{DL}=W_{DAI}^{UL}+4\lceil(U_{scc}-W_{DAI}^{UL})/4\rceil=7$.

If the number of sub-frames on a carrier for which ACK/NACK needs to be fed back in the current uplink sub-frame is determined by the scheme 10 at the UE side and the eNB side, and assumed that $W_{DAI}^{UL}=3$ is indicated by the eNB in the DAI (preferably $W_{DAI}^{UL}$ is determined jointly by conditions of scheduling on the PCC and the SCC, for example, $W_{DAI}^{UL}$ is a value which is the largest one of the numbers of scheduling sub-frames on the PCC and the SCC or is larger than the largest one of the numbers of scheduling sub-frames on the PCC and the SCC), and $S_2=2$ on the PCC and $S_1=7$ on the SCC satisfy $4\lfloor(S_1-1)/4\rfloor \leq S_1-S_2 \leq S_1$ or $S_2 <= \mod(S_1-1,4)+1$, then the number of sub-frames on the PCC for which ACK/NACK needs to be fed back in the current uplink sub-frame is $B_{pcc}^{DL}=W_{DAI}^{UL}=3$, and the number of sub-frames on the SCC for which ACK/NACK needs to be fed back in the current uplink sub-frame is $B_{scc}^{DL}=W_{DAI}^{UL}+4\lceil(U-W_{DAI}^{UL})/4\rceil=7$.

If the number of sub-frames on a carrier for which ACK/NACK needs to be fed back in the current uplink sub-frame is determined by the scheme 11 at the UE side and the eNB side, and assumed that $W_{DAI}^{UL}=3$ is indicated by the eNB in the DAI (preferably $W_{DAI}^{UL}$ is determined jointly by conditions of scheduling on the PCC and the SCC, for example, $W_{DAI}^{UL}$ is a value which is the largest one of the numbers of scheduling sub-frames on the PCC and the SCC or is larger than the largest one of the numbers of scheduling sub-frames on the PCC and the SCC), and $S_2=2$ on the PCC and $S_1=7$ on the SCC satisfy $4\lfloor(S_1-1)/4\rfloor \leq S_1-S_2 \leq S_1$ or $S_2 <= \mod(S_1-1,4)+1$, then the number of sub-frames on the PCC for which ACK/NACK needs to be fed back in the current uplink sub-frame is $B_{pcc}^{DL}=W_{DAI}^{UL}=3$, and the number of sub-frames on the SCC for which ACK/NACK needs to be fed back in the current uplink sub-frame is $B_{scc}^{DL}=W_{DAI}^{UL}+4\lceil(U-W_{DAI}^{UL})/4\rceil=7$.

If the number of sub-frames on a carrier for which ACK/NACK needs to be fed back in the current uplink sub-frame is determined by any one of the schemes 12 to 14 at the UE side and the eNB side, and assumed that $W_{DAI}^{UL}=3$ is indicated by the eNB in the DAI (preferably $W_{DAI}^{UL}$ is determined jointly by conditions of scheduling on the PCC and the SCC, for example, $W_{DAI}^{UL}$ is a value which is the largest of the numbers of scheduling sub-frames on the PCC and the SCC or is larger than the largest one of the numbers of scheduling sub-frames on the PCC and the SCC), and due to U=6>3, then the number of sub-frames on the PCC for which ACK/NACK needs to be fed back in the current uplink sub-frame is $B_{pcc}^{DL}=M_{pcc}=4$, and the number of sub-frames on the SCC for which ACK/NACK needs to be fed back in the current uplink sub-frame is $B_{scc}^{DL}=W_{DAI}^{UL}+4\lceil(U-W_{DAI}^{UL})/4\rceil=7$.

$B_{pcc}^{DL}$ of the PCC and $B_{scc}^{DL}$ of the SCC determined at the eNB side are the same as those determined at the UE side, which doesn't result in the problem of disagreement on understanding of the number of ACK/NACK feedback bits.

Figure 5:
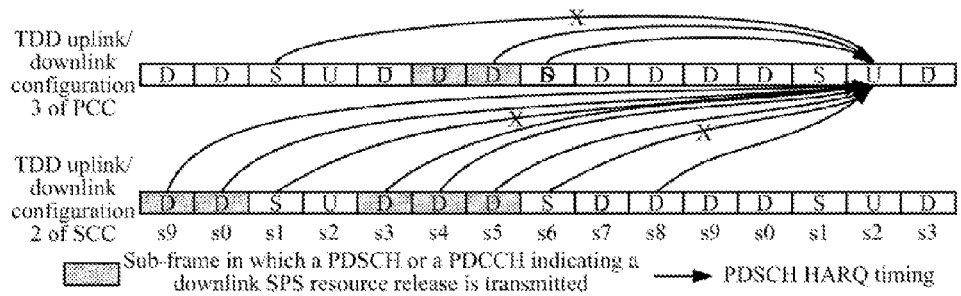
FIG. 5 is a schematic diagram of resources in another application scenario according to an embodiment of the invention.

In another application scenario, when carriers with different TDD uplink/downlink configurations are aggregated for a UE or the aggregated carriers comprise at least one Frequency Division Duplex (FDD) carrier and at least one TDD carrier, the UE feeds back ACK/NACK over a PUSCH with a corresponding PDCCH in a sub-frame 2, the PDCCH includes a DAI field. A TDD uplink/downlink configuration of a PCC notified in SIB1 information is the configuration 3, and a TDD uplink/downlink configuration of an SCC notified in SIB1 information is the configuration 2. A reference TDD uplink/downlink configuration of the PCC is thereby determined as the configuration 3, the number of downlink sub-frames on the PCC in a set of downlink sub-frames associated with the uplink sub-frame 2 is $M_{pcc}^*=3$ as determined from the configuration, and special sub-frames on the PCC correspond to the configuration 0 and the configuration 5 and are with a normal CP, or correspond to the configuration 0 and the configuration 4 and are with an extended CP. Correspondingly the number of downlink sub-frames on the PCC for which ACK/NACK needs to be fed back in the set of downlink sub-frames associated with the current uplink sub-frame is $M_{pcc}=M_{pcc}^*-1=2$, that is, the special sub-frame s1 is precluded. A reference TDD uplink/downlink configuration of the SCC is thereby determined as the configuration 5, the number of downlink sub-frames on the SCC in the set of downlink sub-frames associated with the uplink sub-frame 2 is $M_{scc}^*=8$ as determined from the configuration, and special sub-frames on the SCC correspond to the configuration 0 and the configuration 5 and are with a normal CP, or correspond to the configuration 0 and the configuration 4 and are with an extended CP. Correspondingly the number of downlink sub-frames on the SCC for which ACK/NACK needs to be fed back in the set of downlink sub-frames associated with the current uplink sub-frame is $M_{scc}=M_{scc}^*-2=6>4$, that is, the special sub-frames s1 and s6 are precluded. Assumed that an actual condition of scheduling at the eNB side is the same as an actual condition of reception at the UE side, as illustrated in FIG. 5, where the actual condition of scheduling at the eNB side is the same as the actual condition of reception at the UE side, where "x" denotes that although the special sub-frames s1 and s6 belong to such a set of downlink sub-frames on the carrier associated with the sub-frame 2 that is determined by the reference TDD uplink/downlink configuration, since no ACK/NACK needs to be fed back for these special sub-frames, they are precluded from the $M_c$ downlink sub-frames for which ACK/NACK is fed back. At the eNB side, $U_{pcc}=1$, $U_{scc}=5$ and $U=\max(U_{pcc}, U_{scc})=5$. At the UE side, $U_{pcc}=1$, $U_{scc}=5$ and $U=\max(U_{pcc}, U_{scc})=5$. $W_{DAI}^{UL}=1$ is indicated by the eNB in the DAI. Based upon such application scenario, the SCC is the first category of carrier and determined as the first set of carrier, and the PCC is the second set of carrier.

If the number of sub-frames on a carrier for which ACK/NACK needs to be fed back in the current uplink sub-frame is determined by the scheme 1 at the UE side and the eNB side, then the value of $W_{DAI}^{UL}$ indicated by the eNB in the DAI may not be taken into account; and the number of sub-frames on the PCC for which ACK/NACK needs to be fed back in the current uplink sub-frame is $B_{pcc}^{DL}=M_{pcc}=2$, and the number of sub-frames on the SCC for which ACK/NACK needs to be fed back in the current uplink sub-frame is $B_{scc}^{DL}=M_{scc}=6$.

If the number of sub-frames on a carrier for which ACK/NACK needs to be fed back in the current uplink sub-frame is determined by the scheme 2 at the UE side and the eNB side, then the number of sub-frames on the PCC for which ACK/NACK needs to be fed back in the current uplink sub-frame is $B_{pcc}^{DL}=\min(W_{DAI}^{UL}+4\lceil(U-W_{DAI}^{UL})/4\rceil, M_{pcc})=M_{pcc}=2$, and the number of sub-frames on the SCC for which ACK/NACK needs to be fed back in the current uplink sub-frame is $B_{scc}^{DL}=\min(W_{DAI}^{UL}+4\lceil(U-W_{DAI}^{UL})/4\rceil, M_{scc})=W_{DAI}^{UL}+4\lceil(U-W_{DAI}^{UL})/4\rceil=5$.

If the number of sub-frames on a carrier for which ACK/NACK needs to be fed back in the current uplink sub-frame is determined by the scheme 3 at the UE side and the eNB side, since $S_2=1$ corresponding to the PCC and $S_1=5$ corresponding to the SCC satisfy $\mod(S_1-S_2,4)=0$ or $4\lfloor(S_1-1)/4\rfloor \le S_1-S_2 \le S_1$ or $S_2<=\mod(S_1-1,4)+1$, then the number of sub-frames on the PCC for which ACK/NACK needs to be fed back in the current uplink sub-frame is $B_c^{DL}=W_{DAI}^{UL}+4\lceil(U_{pcc}-W_{DAI}^{UL})/4\rceil=1$, and the number of sub-frames on the SCC for which ACK/NACK needs to be fed back in the current uplink sub-frame is $B_{scc}^{DL}=W_{DAI}^{UL}+4\lceil(U_{scc}-W_{DAI}^{UL})/4\rceil=5$.

If the number of sub-frames on a carrier for which ACK/NACK needs to be fed back in the current uplink sub-frame is determined by the scheme 4 at the UE side and the eNB side, then the number of sub-frames on the PCC for which ACK/NACK needs to be fed back in the current uplink sub-frame is $B_{pcc}^{DL}=\min(W_{DAI}^{UL}, M_{pcc})=1$, and the number of sub-frames on the SCC for which ACK/NACK needs to be fed back in the current uplink sub-frame is $B_{scc}^{DL}=M_{scc}=6$.

If the number of sub-frames on a carrier for which ACK/NACK needs to be fed back in the current uplink sub-frame is determined by the scheme 5 at the UE side and the eNB side, then the number of sub-frames on the PCC for which ACK/NACK needs to be fed back in the current uplink sub-frame is $B_c^{DL}=W_{DAI}^{UL}=1$, and the number of sub-frames on the SCC for which ACK/NACK needs to be fed back in the current uplink sub-frame is $B_{scc}^{DL}=M_{scc}=6$.

If the number of sub-frames on a carrier for which ACK/NACK needs to be fed back in the current uplink sub-frame is determined by the scheme 6 at the UE side and the eNB side, then the number of sub-frames on the PCC for which ACK/NACK needs to be fed back in the current uplink sub-frame is $B_{pcc}^{DL}=M_{pcc}=2$, and the number of sub-frames on the SCC for which ACK/NACK needs to be fed back in the current uplink sub-frame is $B_{scc}^{DL}=W_{DAI}^{UL}+4\lceil(U_{scc}-W_{DAI}^{UL})/4\rceil=5$.

If the number of sub-frames on a carrier for which ACK/NACK needs to be fed back in the current uplink sub-frame is determined by the scheme 7 at the UE side and the eNB side, then the number of sub-frames on the PCC for which ACK/NACK needs to be fed back in the current uplink sub-frame is $B_{pcc}^{DL}=M_{pcc}=2$, and the number of sub-frames on the SCC for which ACK/NACK needs to be fed back in the current uplink sub-frame is $B_{pcc}^{DL}=W_{DAI}^{UL}+4\lceil(U-W_{DAI}^{UL})/4\rceil=5$.

If the number of sub-frames on a carrier for which ACK/NACK needs to be fed back in the current uplink sub-frame is determined by the scheme 8 at the UE side and the eNB side, since $S_2=1$ corresponding to the PCC and $S_1=5$ corresponding to the SCC satisfy $\mod(S_1-S_2,4)=0$ or $4\lfloor(S_1-1)/4\rfloor \le S_1-S_2 \le S_1$ or $S_2<=\mod(S_1-1,4)+1$, then the number of sub-frames on the PCC for which ACK/NACK needs to be fed back in the current uplink sub-frame is $B_{pcc}^{DL}=\min(W_{DAI}^{UL}, M_{pcc})=1$, and the number of sub-frames on the SCC for which ACK/NACK needs to be fed back in the current uplink sub-frame is $B_{scc}^{DL}=W_{DAI}^{UL}+4\lceil(U_{scc}-W_{DAI}^{UL})/4\rceil=5$.

If the number of sub-frames on a carrier for which ACK/NACK needs to be fed back in the current uplink sub-frame is determined by the scheme 9 at the UE side and the eNB side, since $S_2=1$ corresponding to the PCC and $S_1=5$ corresponding to the SCC satisfy $\mod(S_1-S_2,4)=0$ or $4\lfloor(S_1-1)/4\rfloor \le S_1-S_2 \le S_1$ or $S_2\le\mod(S_1-1,4)+1$, then the number of sub-frames on the PCC for which ACK/NACK needs to be fed back in the current uplink sub-frame is $B_{pcc}^{DL}=W_{DAI}^{UL}=1$, and the number of sub-frames on the SCC for which ACK/NACK needs to be fed back in the current uplink sub-frame is $B_{scc}^{DL}=W_{DAI}^{UL}+4\lceil(U_{scc}-W_{DAI}^{UL})/4\rceil=5$.

If the number of sub-frames on a carrier for which ACK/NACK needs to be fed back in the current uplink sub-frame is determined by the scheme 10 at the UE side and the eNB side, since $S_2=1$ corresponding to the PCC and $S_1=5$ corresponding to the SCC satisfy $mod(S_1-S_2,4)=0$ or $4\lfloor(S_1-1)/4\rfloor \leq S_1-S_2 \leq S_1$ or $S_2 <= mod(S_1-1,4)+1$, then the number of sub-frames on the PCC for which ACK/NACK needs to be fed back in the current uplink sub-frame is $B_{pcc}^{DL}=min(W_{DAI}^{UL}, M_{pcc})=1$, and the number of sub-frames on the SCC for which ACK/NACK needs to be fed back in the current uplink sub-frame is $B_{scc}^{DL}=W_{DAI}^{UL}+4\lceil(U-W_{DAI}^{UL})/4\rceil=5$.

If the number of sub-frames on a carrier for which ACK/NACK needs to be fed back in the current uplink sub-frame is determined by the scheme 11 at the UE side and the eNB side, since $S_2=1$ corresponding to the PCC and $S_1=5$ corresponding to the SCC satisfy $mod(S_1-S_2,4)=0$ or $4\lfloor(S_1-1)/4\rfloor \leq S_1-S_2 \leq S_1$ or $S_2 <= mod(S_1-1,4)+1$, then the number of sub-frames on the PCC for which ACK/NACK needs to be fed back in the current uplink sub-frame is $B_{pcc}^{DL}=W_{DAI}^{UL}1$, and the number of sub-frames on the SCC for which ACK/NACK needs to be fed back in the current uplink sub-frame is $B_{scc}^{DL}=W_{DAI}^{UL}+4\lceil(U-W_{DAI}^{UL})/4\rceil=5$.

If the number of sub-frames on a carrier for which ACK/NACK needs to be fed back in the current uplink sub-frame is determined by any one of the schemes 12 to 14 at the UE side and the eNB side, then due to $U=5>1$, the number of sub-frames on the PCC for which ACK/NACK needs to be fed back in the current uplink sub-frame is $B_{pcc}^{DL}=M_{pcc}=2$, and the number of sub-frames on the SCC for which ACK/NACK needs to be fed back in the current uplink sub-frame is $B_{pcc}^{DL}=W_{DAI}^{UL}+4\lceil(U-W_{DAI}^{UL})/4\rceil=7$.

$B_{pcc}^{DL}$ of the PCC and $B_{pcc}^{DL}$ of the SCC determined at the eNB side are the same as those determined at the UE side, which doesn't result in the problem of disagreement on understanding of the number of ACK/NACK feedback bits.

Based upon the same inventive idea, an embodiment of the invention further provides an apparatus for determining the number of ACK/NACK feedback bits, and since the apparatus addresses the problems under a principle similar to the method of determining the number of ACK/NACK feedback bits, reference can be made to the implementation of the method for an implementation of the apparatus, so a repeated description thereof will be omitted here.

Figure 6:
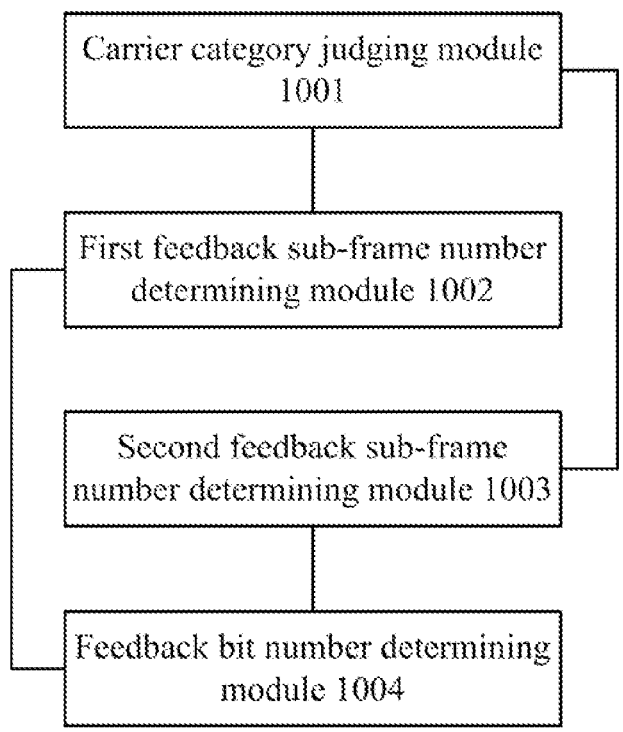
FIG. 6 is a schematic structural diagram of an apparatus according to an embodiment of the invention.

When carriers with different TDD uplink/downlink configurations are aggregated for a UE or the aggregated carriers comprise at least one Frequency Division Duplex (FDD) carrier and at least one TDD carrier, and if the UE feeds back ACK/NACK over a PUSCH with a corresponding PDCCH, the PDCCH includes a DAI field, an embodiment of the invention further provides an apparatus for determining the number of ACK/NACK feedback bits, an implementation of which is as illustrated in FIG. 6, where the structure of the apparatus includes the following modules:

A carrier category judging module 1001 is configured to judge whether there is a first category of carrier among carriers aggregated for a UE.

A first feedback sub-frame number determining module 1002 is configured, if there is the first category of carrier, to determine by a first category of scheme the number of downlink sub-frames, on each carrier c aggregated for the UE, for which ACK/NACK needs to be fed back in the current uplink sub-frame.

A second feedback sub-frame number determining module 1003 is configured, if there is no first category of carrier, to determine by a second category of scheme the number of downlink sub-frames, on each carrier c aggregated for the UE, for which ACK/NACK needs to be fed back in the current uplink sub-frame.

The second feedback sub-frame number determining module 1003 is particularly configured to obtain $W_{DAI}^{UL}$, and $M_c$ of each carrier c aggregated for the UE; and to determine the number $B_c^{DL}$ of downlink sub-frames, on each carrier c aggregated for the UE, for which ACK/NACK needs to be fed back in the current uplink sub-frame, to be $B_c^{DL}=min(W_{DAI}^{UL}, M_c)$.

A feedback bit number determining module 1004 is to determine the number of ACK/NACK feedback bits to be fed back in the current uplink sub-frame from the number of downlink sub-frames on each carrier c for which ACK/NACK needs to be fed back in the current uplink sub-frame.

When carriers with different TDD uplink/downlink configurations are aggregated for a UE or the aggregated carriers comprise at least one Frequency Division Duplex (FDD) carrier and at least one TDD carrier, and if the UE feeds back ACK/NACK over a PUSCH with a corresponding PDCCH which includes a DAI field, the apparatus according to the embodiment of the invention proposes a specific solution to determine $B_c^{DL}$ of the carriers so as to enable the system to operate normally in such an application scenario.

In the apparatus according to the embodiment of the invention, the first feedback sub-frame number determining module 1002 can be particularly configured to determine, from at least one of $M_c$, $W_{DAI}^{UL}$ and $U_c$, the number of downlink sub-frames, on each carrier c aggregated for the UE, for which ACK/NACK needs to be fed back in the current uplink sub-frame; or to divide the carriers aggregated for the UE into a first set of carriers and a second set of carriers, where the first set of carriers is the first category of carriers or such a part of carriers in the first category of carriers that are predefined or that are determined in signaling configuration information, and the second set of carriers is the other carriers than the first category of carriers among the carriers aggregated for the UE, and to determine respectively the number of the downlink sub-frames, on each carrier c in each set of carriers, for which ACK/NACK needs to be fed back in the current uplink sub-frame.

When the first feedback sub-frame number determining module 1002 is configured to determine, from at least one of $M_c$, $W_{DAI}^{UL}$ and $U_c$, the number of downlink sub-frames, on each carrier c aggregated for the UE, for which ACK/NACK needs to be fed back in the current uplink sub-frame, the first feedback sub-frame number determining module 1002 can be particularly configured to obtain $M_c$ of each carrier c; and to determine from $M_c$ the number $B_c^{DL}$ of downlink sub-frames, on each carrier c aggregated for the UE, for which ACK/NACK needs to be fed back in the current uplink sub-frame, to be $B_c^{DL}=M_c$.

When the first feedback sub-frame number determining module 1002 is configured to determine from at least one of $M_c$, $W_{DAI}^{UL}$ and $U_c$ the number of downlink sub-frames, on each carrier c aggregated for the UE, for which ACK/NACK needs to be fed back in the current uplink sub-frame, the first feedback sub-frame number determining module 1002 can be particularly configured to obtain $W_{DAI}^{UL}$ and U, and $M_c$ of each carrier c and to determine the number $B_c^{DL}$ of downlink sub-frames, on each carrier c aggregated for the UE, for which ACK/NACK needs to be fed back in the current uplink sub-frame, to be $B_c^{DL}=\min(W_{DAI}^{UL}+4\lceil(U-W_{DAI}^{UL})/4\rceil, M_c)$.

When the first feedback sub-frame number determining module 1002 is configured to determine from at least one of $M_c$, $W_{DAI}^{UL}$ and $U_c$ the number of downlink sub-frames, on each carrier c aggregated for the UE, for which ACK/NACK needs to be fed back in the current uplink sub-frame, the first feedback sub-frame number determining module 1002 can be particularly configured to obtain $W_{DAI}^{UL}$, $U_c$ of each carrier c and $M_c$ of each carrier c and to determine the number $B_c^{DL}$ of downlink sub-frames, on each carrier c aggregated for the UE, for which ACK/NACK needs to be fed back in the current uplink sub-frame, to be $B_c^{DL}=W_{DAI}^{UL}+4\lceil(U_c-W_{DAI}^{UL})/4\rceil$.

When the first feedback sub-frame number determining module 1002 is configured to divide the carriers aggregated for the UE into the first set of carriers and the second set of carriers and to determine respectively the number of the downlink sub-frames, on each carrier c in each set of carriers, for which ACK/NACK needs to be fed back in the current uplink sub-frame, the first feedback sub-frame number determining module 1002 can be particularly configured to obtain $M_c$ of each carrier c in the first set of carriers and to determine the number $B_c^{DL}$ of downlink sub-frames, on each carrier c in the first set of carriers aggregated for the UE, for which ACK/NACK needs to be fed back in the current uplink sub-frame, to be $B_c^{DL}=M_c$; and to obtain $W_{DAI}^{UL}$ and $M_c$ of each carrier c in the second set of carriers and to determine the number $B_c^{DL}$ of downlink sub-frames, on each carrier c in the second set of carriers aggregated for the UE, for which ACK/NACK needs to be fed back in the current uplink sub-frame, to be $B_c^{DL}=\min(W_{DAI}^{UL}, M_c)$ or to obtain $M_c$ of each carrier c in the first set of carriers and to determine the number $B_c^{DL}$ of downlink sub-frames, on each carrier c in the first set of carriers aggregated for the UE, for which ACK/NACK needs to be fed back in the current uplink sub-frame, to be $B_c^{DL}=M_c$; and to obtain $W_{DAI}^{UL}$ and to determine $B_c^{DL}=W_{DAI}^{UL}$.

When the first feedback sub-frame number determining module 1002 is configured to divide the carriers aggregated for the UE into the first set of carriers and the second set of carriers and to determine respectively the number of the downlink sub-frames, on each carrier c in each set of carriers, for which ACK/NACK needs to be fed back in the current uplink sub-frame, the first feedback sub-frame number determining module 1002 can be particularly configured to obtain $W_{DAI}^{UL}$, and $U_c$ of each carrier c in the first set of carriers and to determine the number $B_c^{DL}$ of downlink sub-frames, on each carrier c in the first set of carriers aggregated for the UE, for which ACK/NACK needs to be fed back in the current uplink sub-frame, to be $B_c^{DL}=W_{DAI}^{UL}+4\lceil(U_c-W_{DAI}^{UL})/4\rceil$; and to obtain c of each carrier c in the second set of carriers and to determine the number $B_c^{DL}$ of downlink sub-frames, on each carrier c in the second set of carriers aggregated for the UE, for which ACK/NACK needs to be fed back in the current uplink sub-frame, to be $B_c^{DL}=M_c$; or to obtain $W_{DAI}^{UL}$ and U and to determine the number $B_c^{DL}$ of downlink sub-frames, on each carrier c in the first set of carriers aggregated for the UE, for which ACK/NACK needs to be fed back in the current uplink sub-frame, to be $B_c^{DL}=W_{DAI}^{UL}+4\lceil(U-W_{DAI}^{UL})/4\rceil$; and to obtain $M_c$ of each carrier c in the second set of carriers and to determine the number $B_c^{DL}$ of downlink sub-frames, on each carrier c in the second set of carriers aggregated for the UE, for which ACK/NACK needs to be fed back in the current uplink sub-frame, to be $B_c^{DL}=M_c$.

When the first feedback sub-frame number determining module 1002 is configured to divide the carriers aggregated for the UE into the first set of carriers and the second set of carriers and to determine respectively the number of the downlink sub-frames, on each carrier c in each set of carriers, for which ACK/NACK needs to be fed back in the current uplink sub-frame, the first feedback sub-frame number determining module 1002 can be particularly configured to obtain $W_{DAI}^{UL}$, and $U_c$ of each carrier c in the first set of carriers and to determine the number $B_c^{DL}$ of downlink sub-frames, on each carrier c in the first set of carriers aggregated for the UE, for which ACK/NACK needs to be fed back in the current uplink sub-frame, to be $B_c^{DL}=W_{DAI}^{UL}+4\lceil(U_c-W_{DAI}^{UL})/4\rceil$; and to obtain $M_c$ of each carrier c in the second set of carriers and to determine the number $B_c^{DL}$ of downlink sub-frames, on each carrier c in the second set of carriers aggregated for the UE, for which ACK/NACK needs to be fed back in the current uplink sub-frame, to be $B_c^{DL}=\min(W_{DAI}^{UL}, M_c)$; or to obtain $W_{DAI}^{UL}$ and $U_c$ of each carrier c in the first set of carriers and to determine the number $B_c^{DL}$ of downlink sub-frames, on each carrier c in the first set of carriers aggregated for the UE, for which ACK/NACK needs to be fed back in the current uplink sub-frame, to be $B_c^{DL}=W_{DAI}^{UL}+4\lceil(U-W_{DAI}^{UL})/4\rceil$; and to determine the number $B_c^{DL}$ of downlink sub-frames, on each carrier c in the second set of carriers aggregated for the UE, for which ACK/NACK needs to be fed back in the current uplink sub-frame, to be $B_c^{DL}=W_{DAI}^{UL}$; or to obtain $W_{DAI}^{UL}$ and U and to determine the number $B_c^{DL}$ of downlink sub-frames, on each carrier c in the first set of carriers aggregated for the UE, for which ACK/NACK needs to be fed back in the current uplink sub-frame, to be $B_c^{DL}=W_{DAI}^{UL}+4\lceil(U-W_{DAI}^{UL})/4\rceil$; and to determine the number $B_c^{DL}$ of downlink sub-frames, on each carrier c in the second set of carriers aggregated for the UE, for which ACK/NACK needs to be fed back in the current uplink sub-frame, to be $B_c^{DL}=W_{DAI}^{UL}$.

When the first feedback sub-frame number determining module 1002 is configured to divide the carriers aggregated for the UE into the first set of carriers and the second set of carriers and to determine respectively the number of the downlink sub-frames, on each carrier c in each set of carriers, for which ACK/NACK needs to be fed back in the current uplink sub-frame, the first feedback sub-frame number determining module 1002 can be particularly configured to obtain $W_{DAI}^{UL}$ and U and to determine the number $B_c^{DL}$ of downlink sub-frames, on each carrier c in the first set of carriers aggregated for the UE, for which ACK/NACK needs to be fed back in the current uplink sub-frame, to be $B_c^{DL}=W_{DAI}^{UL}+4\lceil(U-W_{DAI}^{UL})/4\rceil$; and to obtain $M_c$ of each carrier c in the second set of carriers, and to determine the number $B_c^{DL}$ of downlink sub-frames, on each carrier c in the second set of carriers aggregated for the UE, for which ACK/NACK needs to be fed back in the current uplink sub-frame, to be $B_c^{DL}=\min(W_{DAI}^{UL}, M_c)$ if $U \leq W_{DAI}^{UL}$, otherwise to be $B_c^{DL}=M_c$; or to obtain $W_{DAI}^{UL}$ and U and to determine the number $B_c^{DL}$ of downlink sub-frames, on each carrier c in the first set of carriers aggregated for the UE, for which ACK/NACK needs to be fed back in the current uplink sub-frame, to be $B_c^{DL}=W_{DAI}^{UL}+4\lceil(U-W_{DAI}^{UL})/4\rceil$; and to determine the number $B_c^{DL}$ of downlink sub-frames, on each carrier c in the second set of carriers aggregated for the UE, for which ACK/NACK needs to be fed back in the current uplink sub-frame, to be $B_c^{DL}=W_{DAI}^{UL}$ if $U \leq W_{DAI}^{UL}$, otherwise, to obtain $M_c$ of each carrier c in the second set of carriers, and to determine the number $B_c^{DL}$ of downlink sub-frames, on each carrier c in the second set of carriers aggregated for the UE, for which ACK/NACK needs to be fed back in the current uplink sub-frame, to be $B_c^{DL}=M_c$; or to obtain $W_{DAI}^{UL}$ and U and to determine the number $B_c^{DL}$ of downlink sub-frames, on each carrier c in the first set of carriers aggregated for the UE, for which ACK/NACK needs to be fed back in the current uplink sub-frame, to be $B_c^{DL}=W_{DAI}^{UL}+4\lceil(U-W_{DAI}^{UL})/4\rceil$; and to determine the number $B_c^{DL}$ of downlink sub-frames, on each carrier c in the second set of carriers aggregated for the UE, for which ACK/NACK needs to be fed back in the current uplink sub-frame, to be $B_c^{DL}=W_{DAI}^{UL}+4\lceil(U-W_{DAI}^{UL})/4\rceil$ if $U \leq W_{DAI}^{UL}$, otherwise, to obtain $M_c$ of each carrier c in the second set of carriers, and to determine the number $B_c^{DL}$ of downlink sub-frames, on each carrier c in the second set of carriers aggregated for the UE, for which ACK/NACK needs to be fed back in the current uplink sub-frame, to be $B_c^{DL}=M_c$.

The apparatus according to the embodiment of the invention can further include a third feedback sub-frame number determining module, configured to judge whether $M_c$ of the carrier c is 0, and if $M_c=0$, to determine the number of sub-frames on the carrier c for which ACK/NACK needs to be fed back in the current uplink sub-frame to be 0; otherwise, to trigger the first feedback sub-frame number determining module 1002 or the second feedback sub-frame number determining module 1003 into operation dependent upon the result of judgment by the carrier category judging module 1001.

The apparatus according to the embodiment of the invention can be a UE or an eNB.

It shall be noted that the method and the apparatus according to the embodiments of the invention can be applicable to a scenario where a user equipment, which is configured to transmit ACK/NACK on PUCCH with the PUCCH format 3, transmits ACK/NACK over a PUSCH but also a scenario where a user equipment is configured to transmit ACK/NACK on PUCCH with another PUCCH transmission scheme.

It shall be noted that the method and the apparatus according to the embodiments of the invention can be applicable to a scenario where TDD carriers are aggregated but also to a scenario where a TDD carrier and an FDD carrier are aggregated, the TDD carrier acts as PCC, and DL HARQ timing of the FDD carrier corresponds to a TDD uplink/downlink configuration.

The structure of and processing by the apparatus according to the embodiment of the invention will be described below with respect to preferred structures thereof in hardware.

If the apparatus according to the embodiment of the invention is an eNB, then the eNB includes at least an antenna, a processor and a memory, where the processor of the eNB is configured to perform the particular functions of carrier category judging module, the first feedback sub-frame number determining module, the second f feedback sub-frame number determining module, the third feedback sub-frame number determining module and the feedback bit number determining module in the apparatus according to the embodiment of the invention; and If the apparatus according to the embodiment of the invention is a UE, then the eNB includes at least an antenna, a processor and a memory, where the processor of the UE is configured to perform the particular functions of the carrier category judging module, the first feedback sub-frame number determining module, the second feedback sub-frame number determining module, the third feedback sub-frame number determining module and the feedback bit number determining module in the apparatus according to the embodiment of the invention.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, a CD-ROM, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operations are performed on the computer or the other programmable data processing device to create a computer implemented process so that the instructions executed on the computer or the other programmable device provide operations for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A method of determining a number of Acknowledgment/Non-Acknowledgment (ACK/NACK) feedback bits, wherein when carriers with different Time Division Duplex (TDD) uplink/downlink configurations are aggregated for a User Equipment (UE) or aggregated carriers comprise at least one Frequency Division Duplex (FDD) carrier and at least one TDD carrier, and if the UE feeds back ACK/NACK over a Physical Uplink Shared Channel (PUSCH) with a corresponding Physical Downlink Control Channel (PDCCH), the PDCCH including a Downlink Assignment Index (DAI) field, the method comprising:

determining presence of a first carrier among carriers undergoing carrier aggregation for a UE, that has a reference TDD uplink/downlink configuration that indicates a set of indexes K: $\{k_0, k_1, \ldots k_{M-1}\}$ associated with an uplink sub-frame, and that a number of elements M in the set of indexes is larger than 4; wherein the reference TDD uplink/downlink configuration refers to a TDD uplink/downlink configuration for determining a relationship between a downlink sub-frame on the first carrier and an uplink sub-frame in which ACK/NACK feedback information of the downlink sub-frame is transmitted;

applying, responsive to determining that the first carrier is present among the carriers undergoing carrier aggregation, a first category of scheme to determine the number of downlink sub-frames, on each carrier c aggregated for the UE, for which ACK/NACK is to be fed back in a current uplink sub-frame;

responsive to determining that the first carrier is not present among the carriers undergoing carrier aggregation, obtaining $W_{DAI}^{UL}$, and $M_c$ of each carrier c aggregated for the UE; determining the number $B_c^{DL}$ of downlink sub-frames, on each carrier c aggregated for the UE, for which ACK/NACK is to be fed back in the current uplink sub-frame, to be $B_c^{DL}=\min(W_{DAI}^{UL}, M_c)$; and determining the number of ACK/NACK feedback bits to be fed back in the current uplink sub-frame according to the determined number of downlink sub-frames on each carrier c for which ACK/NACK is to be fed back in the current uplink sub-frame;

wherein $W_{DAI}^{UL}$ represents a value indicated in the DAI field in the PDCCH; and $M_c$ represents the number of downlink sub-frames, for which ACK/NACK is to be fed back, among the set of downlink sub-frames on the carrier c determined by the set of indexes, associated with the current uplink sub-frame, indicated by the reference TDD uplink/downlink configuration of the carrier c.

2. The method according to claim 1, wherein applying, responsive to determining that the first carrier is present among the carriers undergoing carrier aggregation, the first category of scheme to determine the number of downlink sub-frames, on each carrier c aggregated for the UE, for which ACK/NACK is to be fed back in the current uplink sub-frame comprises:

determining, from at least one of $M_c$, $W_{DAI}^{UL}$ and $U_c$, the number of downlink sub-frames, on each carrier c aggregated for the UE, for which ACK/NACK is to be fed back in the current uplink sub-frame; or dividing the carriers undergoing carrier aggregation for the UE into a first set of carriers and a second set of carriers, wherein the first set of carriers forms at least a part of a first category of carriers that are predefined or that are determined from signaling configuration information, and the second set of carriers comprises carriers other than the first category of carriers among the carriers undergoing carrier aggregation for the UE, and determining respectively the number of the downlink sub-frames, on each carrier c in each set of carriers, for which ACK/NACK is to be fed back in the current uplink sub-frame;

wherein for the UE side, $U_c$ represents a total number of downlink sub-frames in which PDSCHs are received and downlink sub-frames in which PDCCHs indicating Semi-Persistent Scheduling (SPS) resource release are received by the UE among the $M_c$ downlink sub-frames on the carrier c associated with the current uplink sub-frame, and for the eNB side, $U_c$ represents a total number of downlink sub-frames in which PDSCHs are transmitted and downlink sub-frames in which PDCCHs indicating SPS resource release are transmitted by the eNB among the $M_c$ downlink sub-frames on the carrier c associated with the current uplink sub-frame.

3. The method according to claim 2, wherein the number of downlink sub-frames, represented by $M_c$, for which ACK/NACK is to be fed back is:

the number of all the downlink sub-frames in the set of downlink sub-frames on the carrier c determined by the set of indexes, associated with the current uplink sub-frame, indicated by the reference TDD uplink/downlink configuration of the carrier c; or if the set of downlink sub-frames on the carrier c determined by the set of indexes, associated with the current uplink sub-frame, indicated by the reference TDD uplink/downlink configuration of the carrier c precludes special sub-frames with corresponding special sub-frame configurations 0 and 5 and with a downlink normal CP or special sub-frames with corresponding special sub-frame configurations 0 and 4 and with a downlink extended CP, then $M_c=M_c^*$; otherwise, $M_c=M_c^*-A$, wherein A represents the number of the special sub-frames in the set of downlink sub-frames, and $M_c^*$ represents the number of downlink sub-frames in the set of downlink sub-frames.

4. The method according to claim 2, wherein determining, from at least one of $M_c$, $W_{DAI}^{UL}$ and $U_c$, the number of downlink sub-frames, on each carrier c aggregated for the UE, for which ACK/NACK is to be fed back in the current uplink sub-frame comprises:

obtaining $M_c$ of each carrier c; and determining from $M_c$ the number $B_c^{DL}$ of downlink sub-frames, on each carrier c aggregated for the UE, for which ACK/NACK is to be fed back in the current uplink sub-frame, to be $B_c^{DL}=M_c$.

5. The method according to claim 2, wherein determining, from at least one of $M_c$, $W_{DAI}^{UL}$ and $U_c$, the number of downlink sub-frames, on each carrier c aggregated for the UE, for which ACK/NACK is to be fed back in the current uplink sub-frame comprises:

obtaining $W_{DAI}^{UL}$ and U, and $M_c$ of each carrier c, and determining the number $B_c^{DL}$ of downlink sub-frames, on each carrier c aggregated for the UE, for which ACK/NACK is to be fed back in the current uplink sub-frame, to be $B_c^{DL}=\min(W_{DAI}^{UL}+4\lceil(U-W_{DAI}^{UL})/4\rceil, M_c)$, wherein U represents the maximum of $U_c$ corresponding to the respective carriers aggregated for the UE;

or, obtaining $W_{DAI}^{UL}$, $U_c$ of each carrier c and $M_c$ of each carrier c, and determining the number $B_c^{DL}$ of downlink sub-frames, on each carrier c aggregated for the UE, for which ACK/NACK is to be fed back in the current uplink sub-frame, to be $B_c^{DL}=W_{DAI}^{UL}+4\lceil(U_c-W_{DAI}^{UL})/4\rceil$.

6. The method according to claim 2, wherein dividing the carriers undergoing carrier aggregation for the UE into the first set of carriers and the second set of carriers and determining respectively the number of the downlink sub-frames, on each carrier c in each set of carriers, for which ACK/NACK is to be fed back in the current uplink sub-frame comprises:

obtaining $M_c$ of each carrier c in the first set of carriers and determining the number $B_c^{DL}$ of downlink sub-frames, on each carrier c in the first set of carriers aggregated for the UE, for which ACK/NACK is to be fed back in the current uplink sub-frame, to be $B_c^{DL}=M_c$; and obtaining $W_{DAI}^{UL}$, and $M_c$ of each carrier c in the second set of carriers and determining the number $B_c^{DL}$ of downlink sub-frames, on each carrier c in the second set of carriers aggregated for the UE, for which ACK/NACK is to be fed back in the current uplink sub-frame, to be $B_c^{DL}=\min(W_{DAI}^{UL}, M_c)$;

or, obtaining $M_c$ of each carrier c in the first set of carriers and determining the number $B_c^{DL}$ of downlink sub-frames, on each carrier c in the first set of carriers aggregated for the UE, for which ACK/NACK is to be fed back in the current uplink sub-frame, to be $B_c^{DL}=M_c$; and obtaining $W_{DAI}^{UL}$, and determining the number $B_c^{DL}$ of downlink sub-frames, on each carrier c in the second set of carriers aggregated for the UE, for which ACK/NACK is to be fed back in the current uplink sub-frame, to be $B_c^{DL}=W_{DAI}^{UL}$.

7. The method according to claim 2, wherein dividing the carriers undergoing carrier aggregation for the UE into the first set of carriers and the second set of carriers and determining respectively the number of the downlink sub-frames, on each carrier c in each set of carriers, for which ACK/NACK is to be fed back in the current uplink sub-frame comprises:

obtaining $W_{DAI}^{UL}$, and $U_c$ of each carrier c in the first set of carriers and determining the number $B_c^{DL}$ of downlink sub-frames, on each carrier c in the first set of carriers aggregated for the UE, for which ACK/NACK is to be fed back in the current uplink sub-frame, to be $B_c^{DL}=W_{DAI}^{UL}+4\lceil(U_c-W_{DAI}^{UL})/4\rceil$; and obtaining $M_c$ of each carrier c in the second set of carriers and determining the number $B_c^{DL}$ of downlink sub-frames, on each carrier c in the second set of carriers aggregated for the UE, for which ACK/NACK is to be fed back in the current uplink sub-frame, to be $B_c^{DL}<M_c$;

or, obtaining $W_{DAI}^{UL}$, and U and determining the number $B_c^{DL}$ of downlink sub-frames, on each carrier c in the first set of carriers aggregated for the UE, for which ACK/NACK is to be fed back in the current uplink sub-frame, to be $B_c^{DL}=W_{DAI}^{UL}+4\lceil(U-W_{DAI}^{UL})/4\rceil$, wherein U represents the maximum of $U_c$ corresponding to the respective carriers aggregated for the UE; and obtaining $M_c$ of each carrier c in the second set of carriers and determining the number $B_c^{DL}$ of downlink sub-frames, on each carrier c in the second set of carriers aggregated for the UE, for which ACK/NACK is to be fed back in the current uplink sub-frame, to be $B_c^{DL}=M_c$.

8. The method according to claim 2, wherein dividing the carriers undergoing carrier aggregation for the UE into the first set of carriers and the second set of carriers and determining respectively the number of the downlink sub-frames, on each carrier c in each set of carriers, for which ACK/NACK is to be fed back in the current uplink sub-frame comprises:

obtaining $W_{DAI}^{UL}$, and $U_c$ of each carrier c in the first set of carriers and determining the number $B_c^{DL}$ of downlink sub-frames, on each carrier c in the first set of carriers aggregated for the UE, for which ACK/NACK is to be fed back in the current uplink sub-frame, to be $B_c^{DL}=W_{DAI}^{UL}+4\lceil(U_c-W_{DAI}^{UL})/4\rceil$; and obtaining $M_c$ of each carrier c in the second set of carriers and determining the number $B_c^{DL}$ of downlink sub-frames, on each carrier c in the second set of carriers aggregated for the UE, for which ACK/NACK is to be fed back in the current uplink sub-frame, to be $B_c^{DL}=\min(W_{DAI}^{UL}, M_c)$;

or obtaining $W_{DAI}^{UL}$, and $U_c$ of each carrier c in the first set of carriers and determining the number $B_c^{DL}$ of downlink sub-frames, on each carrier c in the first set of carriers aggregated for the UE, for which ACK/NACK is to be fed back in the current uplink sub-frame, to be $B_c^{DL}=W_{DAI}^{UL}+4\lceil(U_c-W_{DAI}^{UL})/4\rceil$; and determining the number $B_c^{DL}$ of downlink sub-frames, on each carrier c in the second set of carriers aggregated for the UE, for which ACK/NACK is to be fed back in the current uplink sub-frame, to be $B_c^{DL}=W_{DAI}^{UL}$;

or obtaining $W_{DAI}^{UL}$ and U and determining the number $B_c^{DL}$ of downlink sub-frames, on each carrier c in the first set of carriers aggregated for the UE, for which ACK/NACK is to be fed back in the current uplink sub-frame, to be $B_c^{DL}=W_{DAI}^{UL}+4\lceil(U-W_{DAI}^{UL})/4\rceil$, wherein U represents the maximum of $U_c$ corresponding to the respective carriers aggregated for the UE; and obtaining $M_c$ of each carrier c in the second set of carriers and determining the number $B_c^{DL}$ of downlink sub-frames, on each carrier c in the second set of carriers aggregated for the UE, for which ACK/NACK is to be fed back in the current uplink sub-frame, to be $B_c^{DL}=\min(W_{DAI}^{UL}, M_c)$;

or obtaining $W_{DAI}^{UL}$ and U and determining the number $B_c^{DL}$ of downlink sub-frames, on each carrier c in the first set of carriers aggregated for the UE, for which ACK/NACK is to be fed back in the current uplink sub-frame, to be $B_c^{DL}=W_{DAI}^{UL}+4\lceil(U-W_{DAI}^{UL})/4\rceil$, wherein U represents the maximum of $U_c$ corresponding to the respective carriers aggregated for the UE; and determining the number $B_c^{DL}$ of downlink sub-frames, on each carrier c in the second set of carriers aggregated for the UE, for which ACK/NACK is to be fed back in the current uplink sub-frame, to be $B_c^{DL}=W_{DAI}^{UL}$.

9. The method according to claim 2, wherein dividing the carriers undergoing carrier aggregation for the UE into the first set of carriers and the second set of carriers and determining respectively the number of the downlink subframes, on each carrier c in each set of carriers, for which ACK/NACK is to be fed back in the current uplink sub-frame comprises:

obtaining $W_{DAI}^{UL}$ and U and determining the number $B_c^{DL}$ of downlink sub-frames, on each carrier c in the first set of carriers aggregated for the UE, for which ACK/NACK is to be fed back in the current uplink sub-frame, to be $B_c^{DL}=W_{DAI}^{UL}+4\lceil(U-W_{DAI}^{UL})/4\rceil$, wherein U represents the maximum of $U_c$ corresponding to the respective carriers aggregated for the UE; and obtaining $M_c$ of each carrier c in the second set of carriers, and determining the number $B_c^{DL}$ of downlink sub-frames, on each carrier c in the second set of carriers aggregated for the UE, for which ACK/NACK is to be fed back in the current uplink sub-frame, to be $B_c^{DL}=\min(W_{DAI}^{UL}, M_c)$ if $U \leq W_{DAI}^{UL}$, otherwise to be $B_c^{DL}=M_c$;

or obtaining $W_{DAI}^{UL}$ and U and determining the number $B_c^{DL}$ of downlink sub-frames, on each carrier c in the first set of carriers aggregated for the UE, for which ACK/NACK is to be fed back in the current uplink sub-frame, to be $B_c^{DL}=W_{DAI}^{UL}+4\lceil(U-W_{DAI}^{UL})/4\rceil$, wherein U represents the maximum of $U_c$ corresponding to the respective carriers aggregated for the UE; and if $U \leq W_{DAI}^{UL}$, determining the number $B_c^{DL}$ of downlink sub-frames, on each carrier c in the second set of carriers aggregated for the UE, for which ACK/NACK is to be fed back in the current uplink sub-frame, to be $B_c^{DL}=W_{DAI}^{UL}$, otherwise obtaining $M_c$ of each carrier c in the second set of carriers, and determining the number $B_c^{DL}$ of downlink sub-frames, on each carrier c in the second set of carriers aggregated for the UE, for which ACK/NACK is to be fed back in the current uplink sub-frame, to be $B_c^{DL}=M_c$;

or obtaining $W_{DAI}^{UL}$ and U and determining the number $B_c^{DL}$ of downlink sub-frames, on each carrier c in the first set of carriers aggregated for the UE, for which ACK/NACK is to be fed back in the current uplink sub-frame, to be $B_c^{DL}=W_{DAI}^{UL}+4\lceil(U-W_{DAI}^{UL})/4\rceil$, wherein U represents the maximum of $U_c$ corresponding to the respective carriers aggregated for the UE; and if $U \leq W_{DAI}^{UL}$, determining the number of downlink sub-frames, on each carrier c in the second set of carriers aggregated for the UE, for which ACK/NACK is to be fed back in the current uplink sub-frame, to be $B_c^{DL}=W_{DAI}^{UL}+4\lceil(U-W_{DAI}^{UL})/4\rceil$, otherwise obtaining $M_c$ of each carrier c in the second set of carriers, and determining the number $B_c^{DL}$ of downlink sub-frames, on each carrier c in the second set of carriers aggregated for the UE, for which ACK/NACK is to be fed back in the current uplink sub-frame, to be $B_c^{DL}=M_c$.

10. The method according to claim 1, wherein prior to determining the number of downlink sub-frames, on each carrier c aggregated for the UE, for which ACK/NACK is to be fed back in the current uplink sub-frame, the method further comprises:

judging whether $M_c$ of the carrier c is 0, and if $M_c=0$, then determining the number of downlink sub-frames on the carrier c for which ACK/NACK is to be fed back in the current uplink sub-frame to be 0.

11. An apparatus for determining a number of ACK/NACK feedback bits, wherein when carriers with different TDD uplink/downlink configurations are aggregated for a UE or aggregated carriers comprise at least one Frequency Division Duplex (FDD) carrier and at least one TDD carrier, and if the UE feeds back ACK/NACK over a PUSCH with a corresponding PDCCH, the PDCCH including a DAT field, the apparatus comprising:

circuitry for implementing:

a carrier category judging module, the carrier category judging module configured to determine presence of a first carrier among carriers undergoing carrier aggregation for a UE, that has a reference TDD uplink/downlink configuration that indicates a set of indexes K: $\{k_0, k_1, \ldots k_{M-1}\}$ associated with an uplink sub-frame, and that a number of elements M in the set of indexes is larger than 4; wherein the reference TDD uplink/downlink configuration refers to a TDD uplink/downlink configuration for determining a relationship between a downlink sub-frame on the carrier and an uplink sub-frame in which ACK/NACK feedback information of the downlink sub-frames is transmitted;

a first feedback sub-frame number determining module configured to apply, responsive to determining that the first carrier is present among the carriers undergoing carrier aggregation, a first category of scheme to determine the number of downlink sub-frames, on each carrier c aggregated for the UE, for which ACK/NACK is to be fed back in a current uplink sub-frame;

a second feedback sub-frame number determining module configured to, responsive to determining that the first carrier is not present among the carriers undergoing carrier aggregation, obtain $W_{DAI}^{UL}$, and $M_c$ of each carrier c aggregated for the UE; determine the number $B_c^{DL}$ of downlink sub-frames, on each carrier c aggregated for the UE, for which ACK/NACK is to be fed back in the current uplink sub-frame, to be $B_c^{DL}=\min(W_{DAI}^{UL}, M_c)$; and a feedback bit number determining module configured to determine the number of ACK/NACK feedback bits to be fed back in the current uplink sub-frame according to the determined number of downlink sub-frames on each carrier c for which ACK/NACK is to be fed back in the current uplink sub-frame;

wherein $W_{DAI}^{UL}$ represents a value indicated in the DAI field in the PDCCH; and $M_c$ represents the number of downlink sub-frames, for which ACK/NACK is to be fed back, among the set of downlink sub-frames on the carrier c determined by the set of indexes, associated with the current uplink sub-frame, indicated by the reference TDD uplink/downlink configuration of the carrier c.

12. The apparatus according to claim 11, wherein the first feedback sub-frame number determining module is configured:

to determine, from at least one of $M_c$, $W_{DAI}^{UL}$ and $U_c$, the number of downlink sub-frames, on each carrier c aggregated for the UE, for which ACK/NACK is to be fed back in the current uplink sub-frame; or to divide the carriers undergoing carrier aggregation for the UE into a first set of carriers and a second set of carriers, wherein the first set of carriers forms at least a part of a first category of carriers that are predefined or that are determined from signaling configuration information, and the second set of carriers comprises carriers other than the first category of carriers among the carriers undergoing carrier aggregation for the UE, and to determine respectively the number of the downlink sub-frames, on each carrier c in each set of carriers, for which ACK/NACK is to be fed back in the current uplink sub-frame;

wherein for the UE side, $U_c$ represents a total number of downlink sub-frames in which PDSCHs are received and downlink sub-frames in which PDCCHs indicating SPS resource release are received by the UE among the $M_c$ downlink sub-frames on the carrier c associated with the current uplink sub-frame, and for the eNB side, $U_c$ represents a total number of downlink sub-frames in which PDSCHs are transmitted and downlink sub-frames in which PDCCHs indicating SPS resource release are transmitted by the eNB among the $M_c$ downlink sub-frames on the carrier c associated with the current uplink sub-frame.

13. The apparatus according to claim 12, wherein the first feedback sub-frame number determining module configured to determine, from at least one of $M_c$, $W_{DAI}^{UL}$ and $U_c$, the number of downlink sub-frames, on each carrier c aggregated for the UE, for which ACK/NACK is to be fed back in the current uplink sub-frame, is configured:

to obtain $M_c$ of each carrier c; and to determine from $M_c$ the number $B_c^{DL}$ of downlink sub-frames, on each carrier c aggregated for the UE, for which ACK/NACK is to be fed back in the current uplink sub-frame, to be $B_c^{DL}=M_c$;

or to obtain $W_{DAI}^{UL}$ and U, and $M_c$ of each carrier c and to determine the number $B_c^{DL}$ of downlink sub-frames, on each carrier c aggregated for the UE, for which ACK/NACK is to be fed back in the current uplink sub-frame, to be $B_c^{DL}=\min(W_{DAI}^{UL}+4\lceil(U-W_{DAI}^{UL})/4\rceil, M_c)$, wherein U represents the maximum of $U_c$ corresponding to the respective carriers aggregated for the UE;

or to obtain $W_{DAI}^{UL}$, $U_c$ of each carrier c and $M_c$ of each carrier c and to determine the number $B_c^{DL}$ of downlink sub-frames, on each carrier c aggregated for the UE, for which ACK/NACK is to be fed back in the current uplink sub-frame, to be $B_c^{DL}=W_{DAI}^{UL}+4\lceil(U_c-W_{DAI}^{UL})/4\rceil$.

14. The apparatus according to claim 12, wherein the first feedback sub-frame number determining module configured to divide the carriers undergoing carrier aggregation for the UE into the first set of carriers and the second set of carriers and to determine respectively the number of the downlink sub-frames, on each carrier c in each set of carriers, for which ACK/NACK is to be fed back in the current uplink sub-frame, is configured:

to obtain $M_c$ of each carrier c in the first set of carriers and to determine the number $B_c^{DL}$ of downlink sub-frames, on each carrier c in the first set of carriers aggregated for the UE, for which ACK/NACK is to be fed back in the current uplink sub-frame, to be $B_c^{DL}=M_c$; and to obtain $W_{DAI}^{UL}$, and $M_c$ of each carrier c in the second set of carriers and to determine the number $B_c^{DL}$ of downlink sub-frames, on each carrier c in the second set of carriers aggregated for the UE, for which ACK/NACK is to be fed back in the current uplink sub-frame, to be $B_c^{DL}=\min(W_{DAI}^{UL}, M_c)$;

or to obtain $M_c$ of each carrier c in the first set of carriers and to determine the number $B_c^{DL}$ of downlink sub-frames, on each carrier c in the first set of carriers aggregated for the UE, for which ACK/NACK is to be fed back in the current uplink sub-frame, to be $B_c^{DL}=M_c$; and to obtain $W_{DAI}^{UL}$ and to determine the number $BD^L$ of downlink sub-frames, on each carrier c in the second set of carriers aggregated for the UE, for which ACK/NACK is to be fed back in the current uplink sub-frame, to be $B_c^{DL}=W_{DAI}^{UL}$;

or to obtain $W_{DAI}^{UL}$, and $U_c$ of each carrier c in the first set of carriers and to determine the number $B_c^{UL}$ of downlink sub-frames, on each carrier c in the first set of carriers aggregated for the UE, for which ACK/NACK is to be fed back in the current uplink sub-frame, to be $B_c^{UL}=W_{DAI}^{UL}+4\lceil(U_c-W_{DAI}^{UL})/4\rceil$; and to obtain $M_c$ of each carrier c in the second set of carriers and to determine the number $B_c^{DL}$ of downlink sub-frames, on each carrier c in the second set of carriers aggregated for the UE, for which ACK/NACK is to be fed back in the current uplink sub-frame, to be $B_c^{DL}=M_c$;

or to obtain $W_{DAI}^{UL}$ and U and to determine the number $B_c^{DL}$ of downlink sub-frames, on each carrier c in the first set of carriers aggregated for the UE, for which ACK/NACK is to be fed back in the current uplink sub-frame, to be $B_c^{DL}=W_{DAI}^{UL}+4\lceil(U-W_{DAI}^{UL})/4\rceil$, wherein U represents the maximum of $U_c$ corresponding to the respective carriers aggregated for the UE; and to obtain $M_c$ of each carrier c in the second set of carriers and to determine the number $B_c^{DL}$ of downlink sub-frames, on each carrier c in the second set of carriers aggregated for the UE, for which ACK/NACK is to be fed back in the current uplink sub-frame, to be $B_c^{DL}=M_c$;

or to obtain $W_{DAI}^{UL}$, and $U_c$ of each carrier c in the first set of carriers and to determine the number $B_c^{DL}$ of downlink sub-frames, on each carrier c in the first set of carriers aggregated for the UE, for which ACK/NACK is to be fed back in the current uplink sub-frame, to be $B_c^{DL}=W_{DAI}^{UL}+4\lceil(U_c-W_{DAI}^{UL})/4\rceil$; and to obtain $M_c$ of each carrier c in the second set of carriers and to determine the number $B_c^{DL}$ of downlink sub-frames, on each carrier c in the second set of carriers aggregated for the UE, for which ACK/NACK is to be fed back in the current uplink sub-frame, to be $B_c^{DL}=\min(W_{DAI}^{UL}, M_c)$;

or to obtain $W_{DAI}^{UL}$, and $U_c$ of each carrier c in the first set of carriers and to determine the number $B_c^{DL}$ of downlink sub-frames, on each carrier c in the first set of carriers aggregated for the UE, for which ACK/NACK is to be fed back in the current uplink sub-frame, to be $B_c^{DL}=W_{DAI}^{UL}+4\lceil(U_c-W_{DAI}^{UL})/4\rceil$; and to determine the number $B_c^{DL}$ of downlink sub-frames, on each carrier c in the second set of carriers aggregated for the UE, for which ACK/NACK is to be fed back in the current uplink sub-frame, to be $B_c^{DL}=W_{DAI}^{UL}$;

or to obtain $W_{DAI}^{UL}$ and U and to determine the number $B_c^{DL}$ of downlink sub-frames, on each carrier c in the first set of carriers aggregated for the UE, for which ACK/NACK is to be fed back in the current uplink sub-frame, to be $B_c^{DL}=W_{DAI}^{UL}+4\lceil(U-W_{DAI}^{UL})/4\rceil$, wherein U represents the maximum of $U_c$ corresponding to the respective carriers aggregated for the UE; and to obtain $M_c$ of each carrier c in the second set of carriers and to determine the number $B_c^{DL}$ of downlink sub-frames, on each carrier c in the second set of carriers aggregated for the UE, for which ACK/NACK is to be fed back in the current uplink sub-frame, to be $B_c^{DL}=\min(W_{DAI}^{UL}, M_c)$;

or to obtain $W_{DAI}^{UL}$ and U and to determine the number $B_c^{DL}$ of downlink sub-frames, on each carrier c in the first set of carriers aggregated for the UE, for which ACK/NACK is to be fed back in the current uplink sub-frame, to be $B_c^{DL}=W_{DAI}^{UL}+4\lceil(U-W_{DAI}^{UL})/4\rceil$, wherein U represents the maximum of $U_c$ corresponding to the respective carriers aggregated for the UE; and to determine the number $B_c^{DL}$ of downlink sub-frames, on each carrier c in the second set of carriers aggregated for the UE, for which ACK/NACK is to be fed back in the current uplink sub-frame, to be $B_c^{DL}=W_{DAI}^{UL}$;

or to obtain $W_{DAI}^{UL}$ and U and to determine the number $B_c^{DL}$ of downlink sub-frames, on each carrier c in the first set of carriers aggregated for the UE, for which ACK/NACK is to be fed back in the current uplink sub-frame, to be $B_c^{DL}=W_{DAI}^{UL}+4\lceil(U-W_{DAI}^{UL})/4\rceil$, wherein U represents the maximum of $U_c$ corresponding to the respective carriers aggregated for the UE; and to obtain $M_c$ of each carrier c in the second set of carriers, and to determine the number $B_c^{DL}$ of downlink sub-frames, on each carrier c in the second set of carriers aggregated for the UE, for which ACK/NACK is to be fed back in the current uplink sub-frame, to be $B_c^{DL}=\min(W_{DAI}^{UL}, M_c)$ if $U \le W_{DAI}^{UL}$, otherwise to be $B_c^{DL}=M_c$;

or to obtain $W_{DAI}^{UL}$ and U and to determine the number $B_c^{DL}$ of downlink sub-frames, on each carrier c in the first set of carriers aggregated for the UE, for which ACK/NACK is to be fed back in the current uplink sub-frame, to be $B_c^{DL}=W_{DAI}^{UL}+4\lceil(U-W_{DAI}^{UL})/4\rceil$, wherein U represents the maximum of $U_c$ corresponding to the respective carriers aggregated for the UE; and if $U \le W_{DAI}^{UL}$, to determine the number $B_c^{DL}$ of downlink sub-frames, on each carrier c in the second set of carriers aggregated for the UE, for which ACK/NACK is to be fed back in the current uplink sub-frame, to be $B_c^{DL}=W_{DAI}^{UL}$, otherwise, to obtain $M_c$ of each carrier c in the second set of carriers, and to determine the number $B_c^{DL}$ of downlink sub-frames, on each carrier c in the second set of carriers aggregated for the UE, for which ACK/NACK is to be fed back in the current uplink sub-frame, to be $B_c^{DL}=M_c$;

or to obtain $W_{DAI}^{UL}$ and U and to determine the number $B_c^{DL}$ of downlink sub-frames, on each carrier c in the first set of carriers aggregated for the UE, for which ACK/NACK is to be fed back in the current uplink sub-frame, to be $B_c^{DL}=W_{DAI}^{UL}+4\lceil(U-W_{DAI}^{UL})/4\rceil$, wherein U represents the maximum of $U_c$ corresponding to the respective carriers aggregated for the UE; and if $U \le W_{DAI}^{UL}$, to determine the number $B_c^{DL}$ of downlink sub-frames, on each carrier c in the second set of carriers aggregated for the UE, for which ACK/NACK is to be fed back in the current uplink sub-frame, to be $B_c^{DL}=W_{DAI}^{UL}+4\lceil(U-W_{DAI}^{UL})/4\rceil$, otherwise, to obtain $M_c$ of each carrier c in the second set of carriers, and to determine the number $B_c^{DL}$ of downlink sub-frames, on each carrier c in the second set of carriers aggregated for the UE, for which ACK/NACK is to be fed back in the current uplink sub-frame, to be $B_c^{DL}=M_c$.

15. The apparatus according to claim 14, wherein the circuitry further implements a third feedback sub-frame number determining module, configured to judge whether $M_c$ of the carrier c is 0, and if $M_c=0$, to determine the number of sub-frames on the carrier c for which ACK/NACK is to be fed back in the current uplink sub-frame to be 0; otherwise, to trigger the first feedback sub-frame number determining module or the second feedback sub-frame number determining module into operation responsive to whether the first carrier is determined to be present among the carriers undergoing carrier aggregation.

16. The apparatus according to claim 11, wherein the circuitry further implements a third feedback sub-frame number determining module, configured to judge whether $M_c$ of the carrier c is 0, and if $M_c=0$, to determine the number of sub-frames on the carrier c for which ACK/NACK is to be fed back in the current uplink sub-frame to be 0; otherwise, to trigger the first feedback sub-frame number determining module or the second feedback sub-frame number determining module into operation responsive to whether the first carrier is determined to be present among the carriers undergoing carrier aggregation.

17. The apparatus according to claim 11, wherein the apparatus is a user equipment or the apparatus is a base station.

* * * * *